United States Patent
Kim et al.

(10) Patent No.: US 9,213,205 B2
(45) Date of Patent: Dec. 15, 2015

(54) LIQUID CRYSTAL DISPLAY HAVING MULTIPLE PIXEL REGIONS FOR IMPROVED TRANSMITTANCE

(71) Applicant: Samsung Display Co., Ltd., Yongin, Gyeonggi-Do (KR)

(72) Inventors: Hoon Kim, Ansan-si (KR); Su Jeong Kim, Seoul (KR); Ki Chul Shin, Seongnam-si (KR); Dan Bi Yang, Gunpo-si (KR); Jae-Hoon Jung, Anyang-si (KR); Min Ju Han, Seoul (KR); Ji Phyo Hong, Pyeongtaek-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/090,593

(22) Filed: Nov. 26, 2013

(65) Prior Publication Data

US 2014/0211142 A1    Jul. 31, 2014

(30) Foreign Application Priority Data

Jan. 30, 2013    (KR) .................. 10-2013-0010639

(51) Int. Cl.
*G02F 1/1337*    (2006.01)
*G02F 1/1343*    (2006.01)
(Continued)

(52) U.S. Cl.
CPC ...... *G02F 1/134336* (2013.01); *G02F 1/13624* (2013.01); *G02F 1/133707* (2013.01); *G02F 1/134309* (2013.01); *G02F 2001/13712* (2013.01); *G02F 2001/133742* (2013.01); *G02F 2001/134345* (2013.01); *G02F 2203/30* (2013.01); *G02F 2203/64* (2013.01)

(58) Field of Classification Search
CPC .................. G02F 1/133707; G02F 1/1393
USPC .................................... 349/129–130
See application file for complete search history.

(56) References Cited

U.S. PATENT DOCUMENTS 7,961,265 B2 *   6/2011   Lu et al. .................... 349/48
8,115,894 B2    2/2012   Kim et al.
(Continued)

FOREIGN PATENT DOCUMENTS

KR    1020120031801 A    4/2012
KR    1020120050645 A    5/2012

OTHER PUBLICATIONS

Extended European Search Report, Application No. 13192255.1, mailed on May 21, 2014.

*Primary Examiner* — Thanh-Nhan P Nguyen
(74) *Attorney, Agent, or Firm* — Innovation Counsel LLP

(57) ABSTRACT

A liquid crystal display according to an exemplary embodiment of the present invention includes: a first substrate; a first subpixel electrode positioned on the first substrate and configured to receive a first voltage; a second subpixel electrode positioned on the first substrate and configured to receive a second voltage; an insulating layer positioned between the first subpixel electrode and the second subpixel electrode; a second substrate facing the first substrate; and a common electrode positioned on the second substrate. A portion of the first subpixel electrode and a portion of the second subpixel electrode overlap each other with the insulating layer interposed therebetween, and a difference between the first voltage and a common voltage is larger than a difference between the second voltage and the common voltage.

30 Claims, 26 Drawing Sheets

(51) Int. Cl.
*G02F 1/1362* (2006.01)
*G02F 1/137* (2006.01)

(56) References Cited

U.S. PATENT DOCUMENTS

| | | |
|---|---|---|
| 8,203,687 B2 | 6/2012 | Choi et al. |
| 2009/0295693 A1 | 12/2009 | Yeom et al. |
| 2010/0123867 A1 | 5/2010 | Jung et al. |
| 2010/0245698 A1 | 9/2010 | Kim et al. |
| 2011/0085102 A1 | 4/2011 | Kim |
| 2011/0194059 A1 | 8/2011 | Yamazaki |
| 2011/0317119 A1 | 12/2011 | Jung et al. |
| 2012/0154723 A1 | 6/2012 | Chang et al. |
| 2012/0281172 A1* | 11/2012 | Park et al. ............. 349/123 |
| 2013/0002625 A1* | 1/2013 | Liao et al. ............. 345/205 |

\* cited by examiner (a) (b) (c) (d) (e)

LIQUID CRYSTAL DISPLAY HAVING MULTIPLE PIXEL REGIONS FOR IMPROVED TRANSMITTANCE

CROSS-REFERENCE TO RELATED APPLICATION

This application claims priority to, and the benefit of, Korean Patent Application No. 10-2013-0010639 filed in the Korean Intellectual Property Office on Jan. 30, 2013, the entire contents of which are incorporated herein by reference.

BACKGROUND OF THE INVENTION (a) Technical Field

Embodiments of the present invention relate generally to flat panel displays. More specifically, embodiments of the present invention relate to liquid crystal displays having multiple pixel regions for improved transmittance.

(b) Description of the Related Art

A liquid crystal display, which is one of the most common types of flat panel displays currently in use, includes two panels with field generating electrodes such as a pixel electrode, a common electrode, and the like, with a liquid crystal layer interposed therebetween.

The liquid crystal display generates an electric field in the liquid crystal layer by applying a voltage to the field generating electrodes, and determines the orientation of liquid crystal molecules of the liquid crystal layer by the generated electric field, thus controlling polarization of incident light so as to display images.

The LCD also includes switching elements connected to the respective pixel electrodes, and a plurality of signal lines such as gate lines and data lines for controlling the switching elements and applying voltages to the pixel electrodes.

Different types of LCDs exist. A vertical alignment (VA) mode LCD, which aligns LC molecules such that their long axes are perpendicular to the panels in the absence of an electric field, is sometimes preferred because of its relatively high contrast ratio and wide reference viewing angle. Here, the reference viewing angle implies a viewing angle that has a contrast ratio of 1:10, or a critical angle of gray-to-gray luminance reversion.

In order to approximate side visibility to front visibility in the vertical alignment mode LCD, a method of causing a difference in transmittance by dividing one pixel into two sub-pixels and applying different voltages to the two subpixels has been suggested.

However, when approximating the side visibility to the front visibility by dividing one pixel into two subpixels and forming different transmittances, the luminance is increased at a low gray or high gray such that gray expression is difficult at the sides, thereby deteriorating display quality.

Also, when dividing one pixel into two subpixels, the transmittance is decreased according to the interval between the two subpixels.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal display having advantages of expressing more accurate gray in a low gray region and preventing transmittance deterioration while side visibility is close to front visibility.

A liquid crystal display according to an exemplary embodiment of the present invention includes: a first subpixel electrode positioned on a first substrate and configured to receive a first voltage; a second subpixel electrode positioned on the first substrate and configured to receive a second voltage; and an insulating layer positioned between the first subpixel electrode and the second subpixel electrode, wherein a portion of the first subpixel electrode and a portion of the second subpixel electrode overlap each other with the insulating layer interposed therebetween.

The liquid crystal display further includes: a second substrate facing the first substrate; and a common electrode positioned on the second substrate, wherein a difference between the first voltage and a common voltage may be larger than a difference between the second voltage and the common voltage.

At least a portion of the first subpixel electrode may be positioned under the insulating layer, and the second subpixel electrode may be positioned on the insulating layer.

The first portion of the first subpixel electrode may include a first subregion positioned under the insulating layer and a second subregion positioned on the insulating layer, and the first subregion and the second subregion may be connected to each other through a contact hole formed in the insulating layer.

The second portion of the second subpixel electrode may include a plurality of branch electrodes extending in a plurality of different directions.

At least part of the second subpixel electrode besides the portion of the second subpixel electrode may be at least approximately planar.

The second subpixel electrode may have a cutout formed proximate to at least one of its outer edges.

The portion of the first subpixel electrode may be a first portion, and the first subpixel electrode may further include a second portion that does not overlap the portion of the second subpixel electrode, and the insulating layer may have a plurality of openings corresponding to the second portion of the first subpixel electrode.

A liquid crystal display according to another exemplary embodiment of the present invention includes: a first substrate; a first subpixel electrode positioned on the first substrate and configured to receive a first voltage; a second subpixel electrode positioned on the first substrate and configured to receive a second voltage; and an insulating layer positioned between the first subpixel electrode and the second subpixel electrode. One pixel area includes a first region in which a first portion of the first subpixel electrode is positioned, a second region in which a second portion of the first subpixel electrode and a first portion of the second subpixel electrode overlap each other, and a third region in which a second portion of the second subpixel electrode is positioned.

The second portion of the first subpixel electrode may be positioned under the insulating layer, the first portion of the first subpixel electrode may be positioned on the insulating layer, and the first portion and the second portion may be connected to each other through a contact hole formed in the insulating layer.

The first portion of the second subpixel electrode may include a plurality of branch electrodes extending in a plurality of different directions.

At least part of the second portion of the second subpixel electrode may be at least approximately planar.

The insulating layer may have a plurality of openings corresponding to the first portion of the first subpixel electrode.

In the liquid crystal display according to an exemplary embodiment of the present invention, a first subpixel electrode and a second subpixel electrode are formed, and a portion of the first subpixel electrode and a portion of the second subpixel electrode overlap each other to divide one pixel area into a first region containing the first subpixel electrode (but not the second subpixel electrode), a second region containing an area of overlap between the first subpixel electrode and the second subpixel electrode, and a third region containing the second subpixel electrode (but not the first subpixel electrode). Accordingly, an accurate gray in a low gray region may be realized along with side visibility that is close to front visibility, and transmittance deterioration that may be generated in the region between the first subpixel electrode and the second subpixel electrode may be reduced or prevented.

DETAILED DESCRIPTION OF THE EMBODIMENTS

Figure 1:
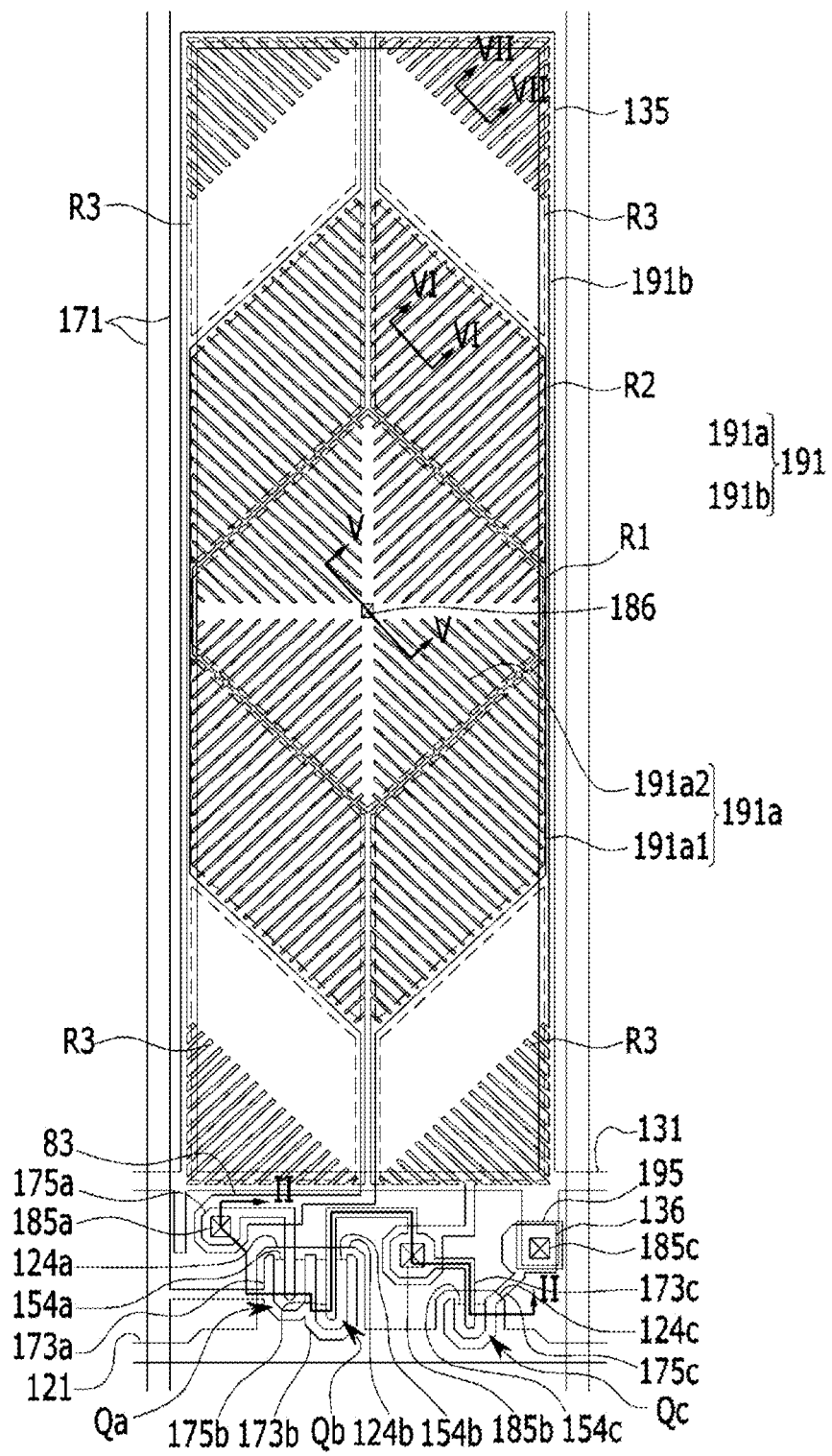
FIG. 1 is a layout view of the liquid crystal display according to the exemplary embodiment of the present invention.

Exemplary embodiments of the present invention will be described in detail with reference to the attached drawings. The present invention may be modified in many different forms, and should not be construed as being limited to the exemplary embodiments set forth herein. Rather, the exemplary embodiments of the present invention are provided so that this disclosure will be thorough and complete, and will fully convey the concept of the present invention to those skilled in the art.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. Like numbers refer to like elements throughout the specification. The drawings are not necessarily to scale. Any combination and/or permutation of any of the various features of any of the embodiments described herein is contemplated.

Figure 2:
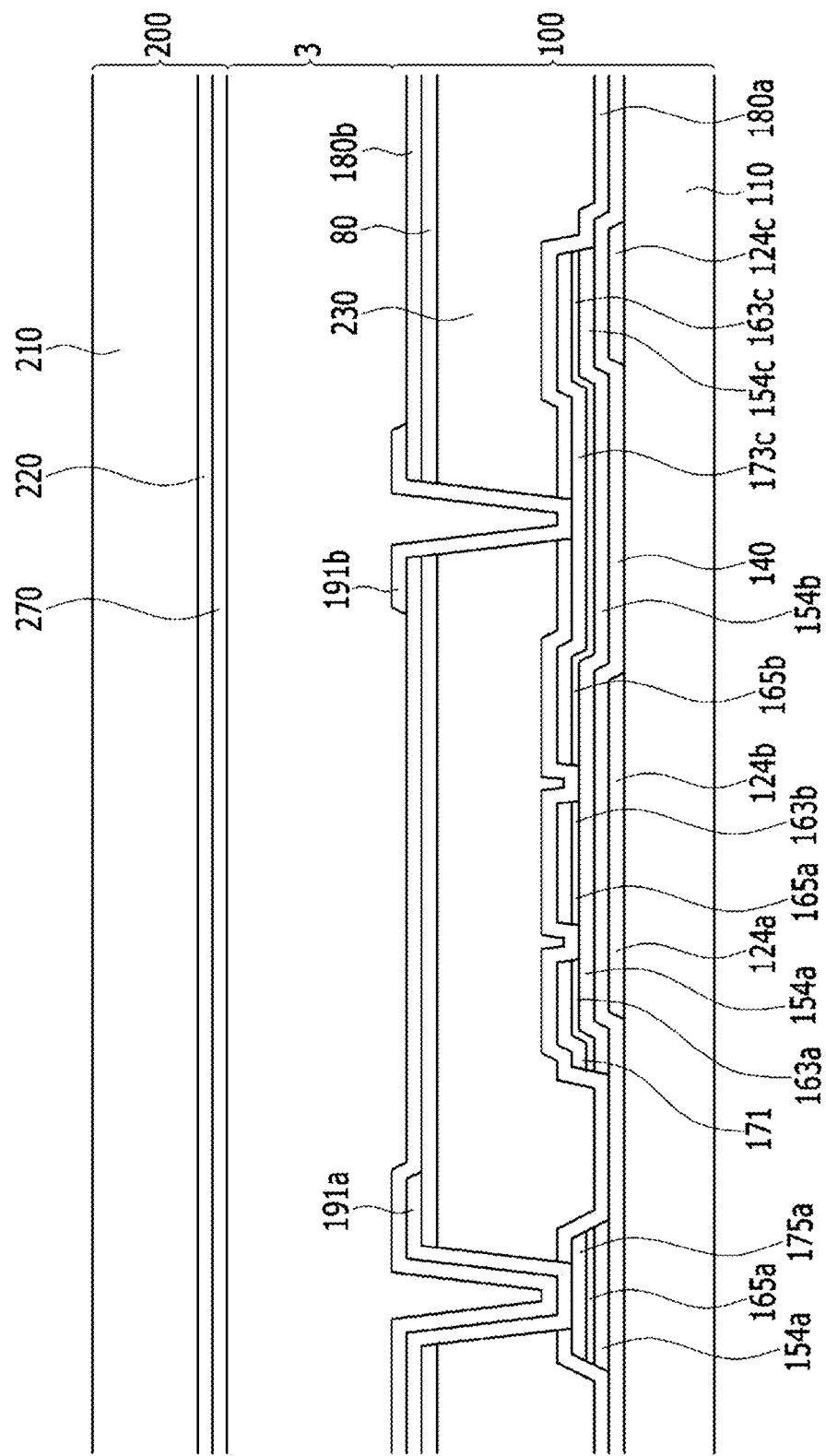
FIG. 2 is a cross-sectional view of the liquid crystal display taken along the line II-II of FIG. 1.
Figure 3:
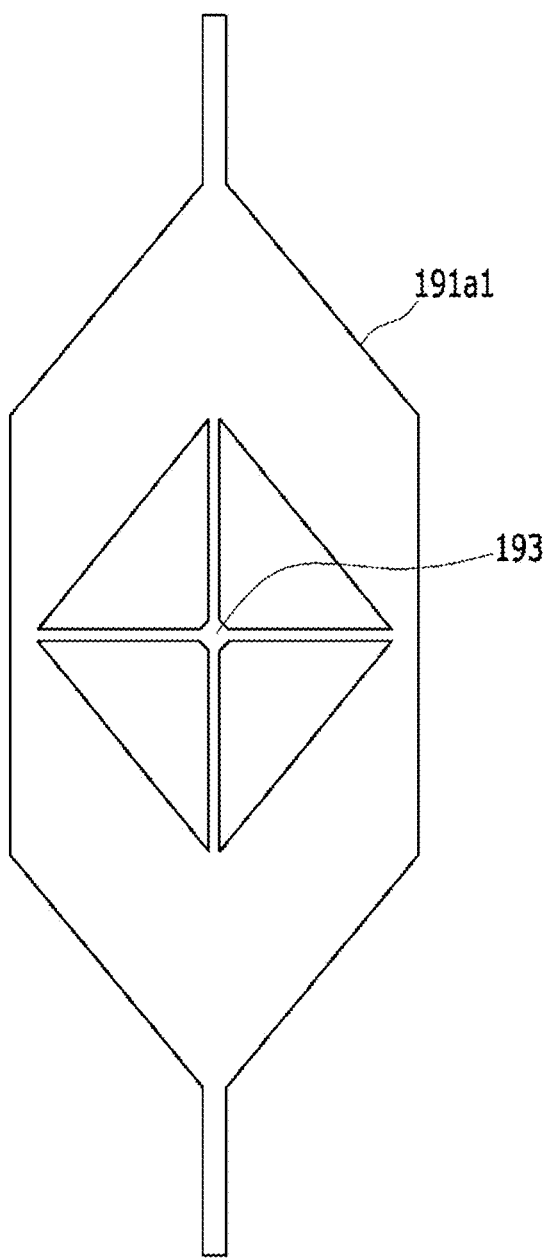
FIG. 3 is a layout view of the first subpixel electrode of the liquid crystal display of FIG. 1.
Figure 4:
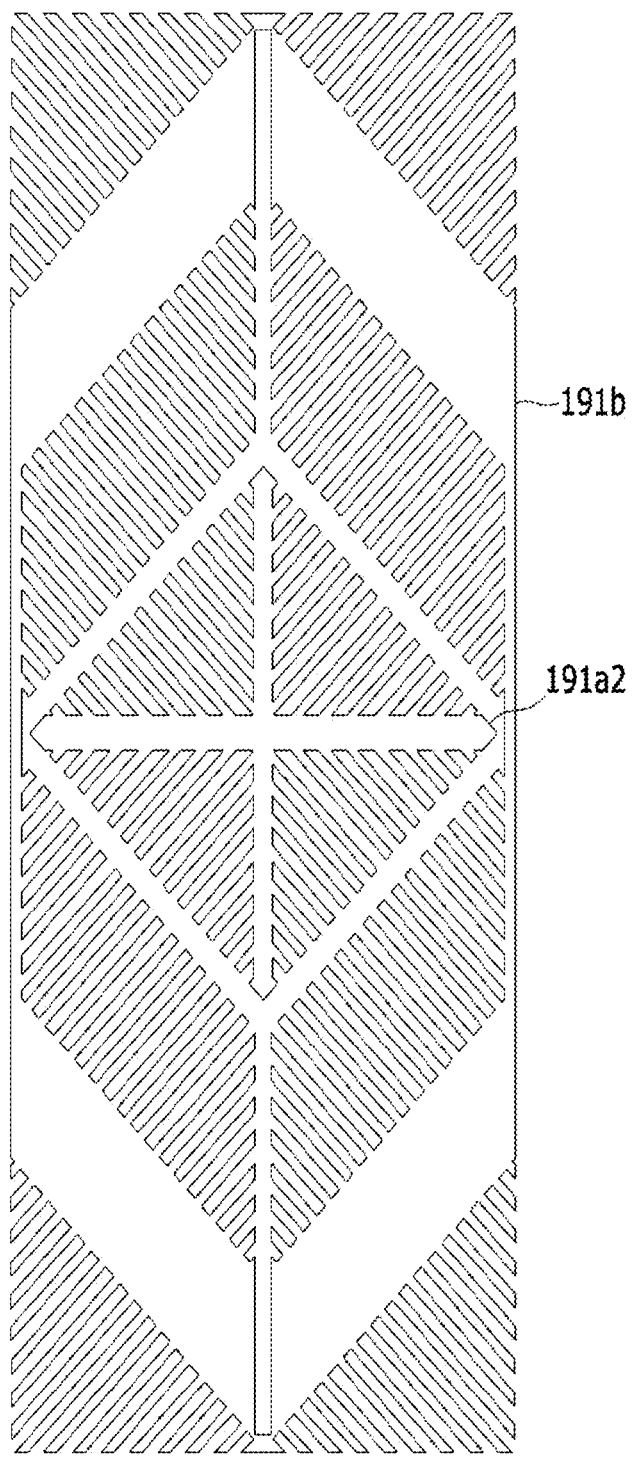
FIG. 4 is a layout view of a portion of the first subpixel electrode and the second subpixel electrode of the liquid crystal display of FIG. 1.
Figure 5:
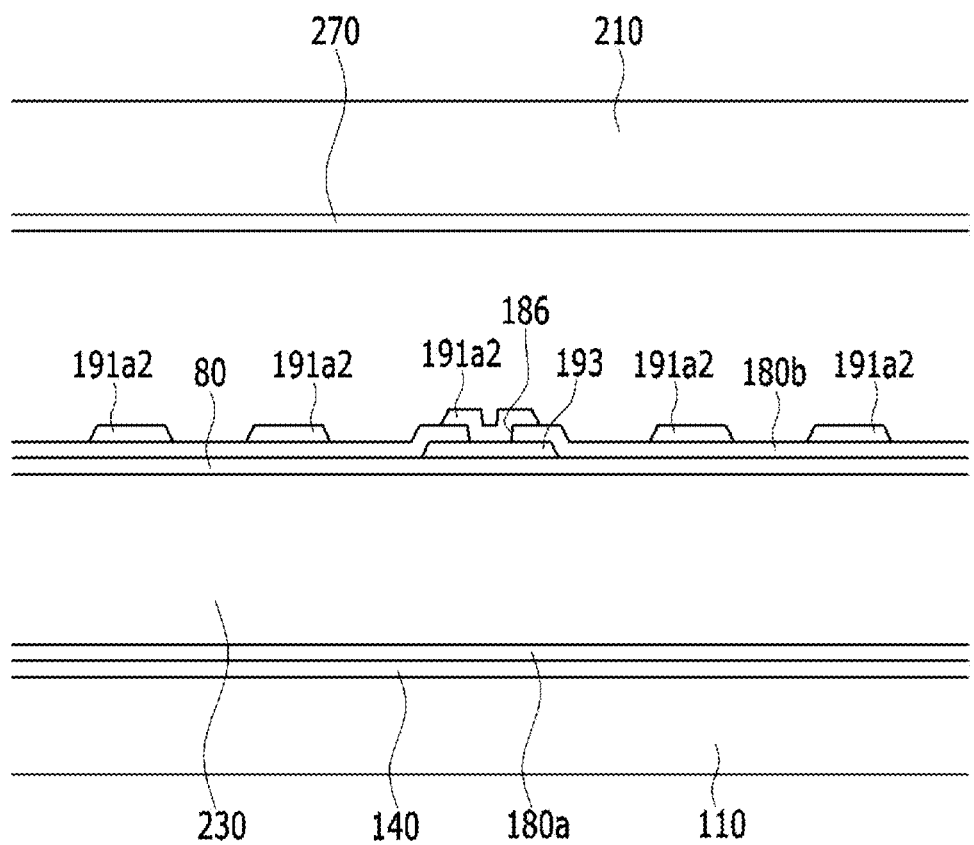
FIG. 5 is a cross-sectional view of the liquid crystal display taken along the line V-V of FIG. 1.
Figure 6:
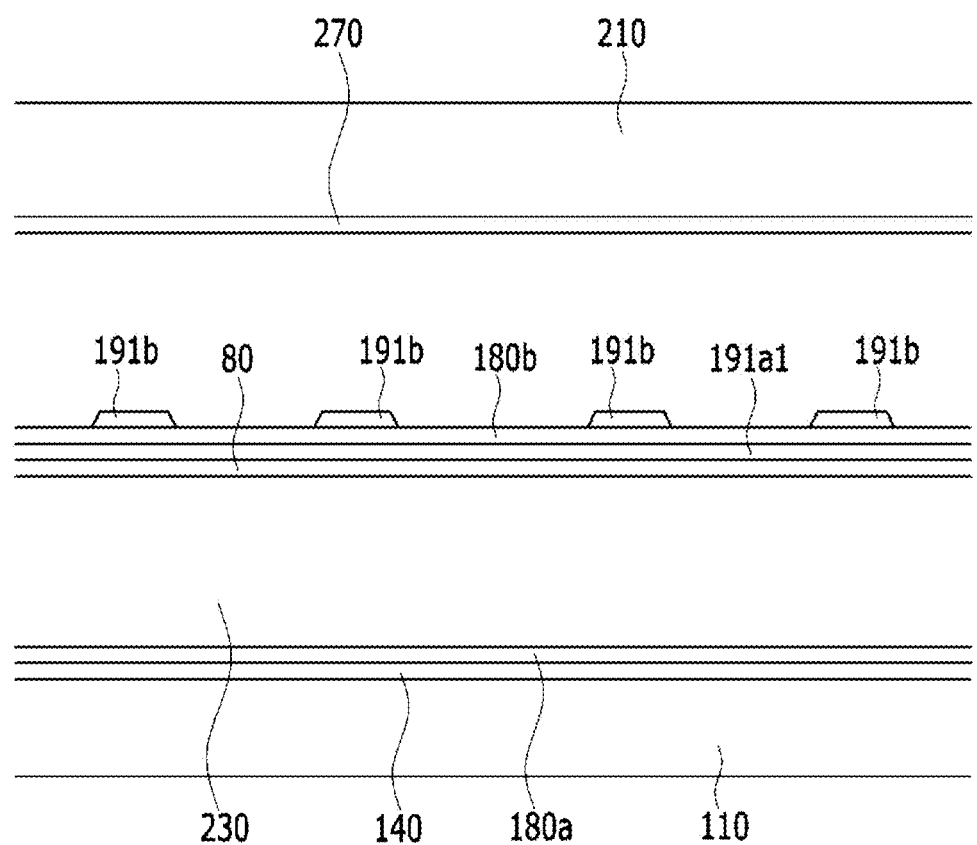
FIG. 6 is a cross-sectional view of the liquid crystal display taken along the line VI-VI of FIG. 1.
Figure 7:
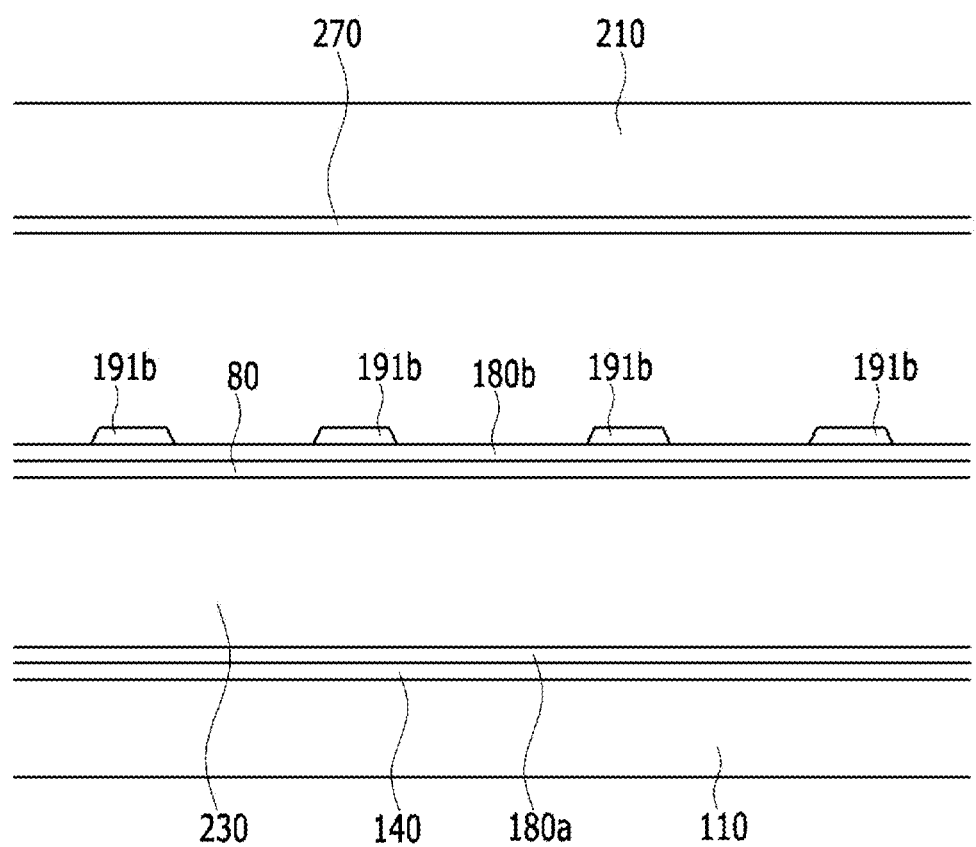
FIG. 7 is a cross-sectional view of the liquid crystal display taken along the line VII-VII of FIG. 1.

Now, a liquid crystal display according to an exemplary embodiment of the present invention will be described with reference to FIG. 1 to FIG. 7. FIG. 1 is a layout view of the liquid crystal display according to the exemplary embodiment of the present invention. FIG. 2 is a cross-sectional view of the liquid crystal display taken along the line II-II of FIG. 1. FIG. 3 is a layout view of the first subpixel electrode of the liquid crystal display of FIG. 1. FIG. 4 is a layout view of a portion of the first subpixel electrode and the second subpixel electrode of the liquid crystal display of FIG. 1. FIG. 5 is a cross-sectional view of the liquid crystal display taken along the line V-V of FIG. 1. FIG. 6 is a cross-sectional view of the liquid crystal display taken along the line VI-VI of FIG. 1. FIG. 7 is a cross-sectional view of the liquid crystal display taken along the line VII-VII of FIG. 1.

Firstly, referring to FIG. 1 and FIG. 2, a liquid crystal display according to the present exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are formed on an insulation substrate 110 made of transparent glass or plastic. The gate line 121 transfers a gate signal and mainly extends in a transverse direction.

The gate line 121 includes a first gate electrode 124a, a second gate electrode 124b, a third gate electrode 124c, and a wide end (not shown) for electrical connection with other layers or with an external driving circuit.

The reference voltage line 131 may extend in parallel to the gate line 121 and may have an expansion 136, where the expansion 136 is connected to a third drain electrode 175c that will be described later.

The reference voltage line 131 includes the storage electrode 135 enclosing a pixel area.

A gate insulating layer 140 is formed on the gate line 121, the reference voltage line 131, and the storage electrode 135.

A first semiconductor 154a, a second semiconductor 154b, and a third semiconductor 154c that may be made of amorphous silicon or crystalline silicon, are positioned on the gate insulating layer 140.

A plurality of ohmic contacts 163a, 163b, 163c, 165a, and 165b are formed on the first semiconductor 154a, the second semiconductor 154b, and the third semiconductor 154c. When the semiconductors 154a, 154b, and 154c are formed with an oxide semiconductor, the ohmic contacts may be omitted.

Data conductor 171, 173a, 173b 173c, 175a, 175b, and 175c, including a data line 171 that has a first source electrode 173a and a second source electrode 173b, a first drain electrode 175a, a second drain electrode 175b, a third source electrode 173c, and a third drain electrode 175c, is formed on the ohmic contacts 163a, 163b, 163c, 165a, and 165b and the gate insulating layer 140.

The second drain electrode 175b is connected to the third source electrode 173c.

The first gate electrode 124a, the first source electrode 173a, and the first drain electrode 175a form a first thin film transistor Qa along with the first semiconductor 154a, and a channel of this thin film transistor is formed in the semiconductor 154a between the first source electrode 173a and the first drain electrode 175a. Similarly, the second gate electrode 124b, the second source electrode 173b, and the second drain electrode 175b form a second thin film transistor Qb along with the second semiconductor 154b, and a channel of this thin film transistor is formed in the semiconductor 154b between the second source electrode 173b and the second drain electrode 175b. Likewise, the third gate electrode 124c, the third source electrode 173c, and the third drain electrode 175c form a third thin film transistor Qc along with the third semiconductor Qc, and a channel of this thin film transistor is formed in the semiconductor 154c between the third source electrode 173c and the third drain electrode 175c.

A first passivation layer 180a, that may be made of an inorganic insulator such as silicon nitride or silicon oxide, is formed on the data conductors 171, 173a, 173b, 173c, 175a, 175b, and 175c and exposed portions of the semiconductors 154a, 154b, and 154c.

A color filter 230 is positioned on the first passivation layer 180a.

A light blocking member (not shown) is positioned on a region where the color filter 230 is not positioned, as well as on a portion of the color filter 230. The light blocking member is referred to as a black matrix and prevents light leakage.

An overcoat (capping layer) 80 is positioned on the color filter 230. The overcoat 80 prevents peeling of the color filter 230 and the light blocking member, and suppresses contamination of the liquid crystal layer 3 by an organic material of the solvent that inflows from the color filter 230, so that it prevents defects such as afterimages that may occur when an image is driven.

A first subregion 191a1 of a first subpixel electrode 191a is formed on the overcoat 80.

Referring to FIG. 3, the first subregion 191a1 of the first subpixel electrode 191a has a plane shape (i.e. is at least approximately planar) positioned at the center of the pixel area, and includes a cross-shaped connection and four parallelograms positioned near the cross-shaped connection and enclosing, or surrounding, the cross-shaped connection. In FIG. 3, the four parallelograms form the two chevron-shaped structures directly above and below the cross-shaped connection. A first expansion 193 is positioned at a center portion of the cross-shaped connection. Also, a protrusion extending upward and downward from a transverse center portion of the pixel area is provided. The first subregion 191a1 of the first subpixel electrode 191a is positioned over a portion of the pixel area.

A second passivation layer 180b is formed on the overcoat 80 and the first subregion 191a1 of the first subpixel electrode 191a.

A second subregion 191a2 of the first subpixel electrode 191a, and the second subpixel electrode 191b, are formed on the second passivation layer 180b.

Referring to FIG. 4, the second subregion 191a2 of the first subpixel electrode 191a is positioned at the center portion of the pixel, and generally outlines a rhombus shape. The second subregion 191a2 of the first subpixel electrode 191a includes a cross-shaped stem having a transverse portion and a longitudinal portion, and a plurality of first branch electrodes extending from the cross-shaped stem. The first branch electrodes extend in four directions.

The second subpixel electrode 191b includes a third subregion overlapping the first subregion 191a1 of the first subpixel electrode 191a, and a fourth subregion. The third subregion of the second subpixel electrode 191b overlaps the first subregion 191a1 of the first subpixel electrode 191a via an insulating layer (i.e. the second passivation layer 180b), and includes a plurality of second branch electrodes extending in the same directions as those of a plurality of the first branch electrodes of the second subregion 191a2 of the first subpixel electrode 191a.

The fourth subregion of the second subpixel electrode 191b includes a planar plate portion with a trapezoid shape, and a plurality of the third branch electrodespositioned outside the plate portion and extending in a direction parallel to the plurality of the second branch electrodes. The plate shape is a plate shape as it is without splitting.

The first passivation layer 180a and the overcoat 80 have a first contact hole 185a exposing a portion of the first drain electrode 175a, and the first passivation layer 180a, the overcoat 80, and the second passivation layer 180b have a second contact hole 185b exposing a portion of the second drain electrode 175b. Also, the second passivation layer 180b has a third contact hole 186 exposing a center portion of the first subregion 191a1 of the first subpixel electrode 191a. The first passivation layer 180a and the overcoat 80 have a fourth contact hole 185c exposing the expansion 136 of the reference voltage line 131 and a portion of the third drain electrode 175c.

The first subregion 191a1 of the first subpixel electrode 191a is physically and electrically connected to the first drain electrode 175a through the first contact hole 185a, and the second subpixel electrode 191b is physically and electrically connected to the second drain electrode 175b through the second contact hole 185b. Also, the second subregion 191a2 of the first subpixel electrode 191a is connected to the first expansion 193 of the first subregion 191a1 of the first subpixel electrode 191a through the third contact hole 186 formed in the second passivation layer 180b. The expansion 136 of the reference voltage line 131 is connected to a portion of the third drain electrode 175c by a connecting member 195 disposed on the fourth contact hole 185c. The connecting member 195 may be formed with the same layer as the second subpixel electrode 191.

The first subpixel electrode 191a and the second subpixel electrode 191b receive the data voltage from the first drain electrode 175a and the second drain electrode 175b, through the first contact hole 185a and the second contact hole 185b respectively.

Now, the upper panel 200 will be described.

A light blocking member 220 and a common electrode 270 are formed on an insulation substrate 210 made of transparent glass or plastic.

However, in the case of a liquid crystal display according to another exemplary embodiment of the present invention, the light blocking member 220 may instead be positioned on the lower panel 100, and in the case of a liquid crystal display according to another exemplary embodiment of the present invention, the color filter may instead be positioned on the upper panel 200.

Alignment layers (not shown) may be formed on an inner surface of the display panels 100 and 200, and they may be vertical alignment layers.

A polarizer (not shown) may be provided on the outer surface of each of the two display panels 100 and 200, and it is preferable that transmissive axes of the two polarizers may be orthogonal to each other and that any one transmissive axis is parallel to the gate line 121. However, the polarizer may alternatively be disposed only at one outer surface of the two display panels 100 and 200.

The liquid crystal layer 3 has negative dielectric anisotropy, and liquid crystal molecules of the liquid crystal layer 3 may be aligned so that long axes thereof are perpendicular with respect to the surface of the two display panels 100 and 200 when no electric field is applied. Therefore, the incident light does not pass through the crossed polarizers but is blocked when there is no applied electric field.

At least one of the liquid crystal layer 3 and the alignment layer may include a photoreactive material, in detail, a reactive mesogen.

Next, a driving method of a liquid crystal display according to the present exemplary embodiment will be described.

If a gate-on signal is applied to the gate line 121, the first gate electrode 124a, the second gate electrode 124b, and the third gate electrode 124c receive the gate-on signal such that the first switching element Qa, the second switching element Qb, and the third switching element Qc are each turned on. Accordingly, the data voltage applied to the data line 171 is applied to the first subpixel electrode 191a and the second subpixel electrode 191b through the turned-on first switching element Qa and second switching element Qb. The voltage applied to the second subpixel electrode 191b is divided through the third switching element Qc connected in series to the second switching element Qb. Accordingly, the voltage applied to the second subpixel electrode 191b is lower than the voltage applied to the first subpixel electrode 191a.

Again, referring to FIG. 1, one pixel area of the liquid crystal display according to the present exemplary embodiment includes a first region R1 where the second subregion 191a2 of the first subpixel electrode 191a is positioned, a second region R2 where a portion of the first subregion 191a1 of the first subpixel electrode 191a and a portion of the second subpixel electrode 191b overlap each other, and a third region R3 where a portion of the second subpixel electrode 191b is positioned.

The first region R1, the second region R2, and the third region R3 respectively include four subregions. In four subregions, the liquid crystal molecules are aligned in different directions.

An area of the second region R2 may be about two times the area of the first region R1, and the area of the third region R3 may be about two times the area of the second region R2.

Next, the first region R1, the second region R2, and the third region R3 included in one pixel area of a liquid crystal display according to the present exemplary embodiment will be described with reference to FIG. 5 to FIG. 7.

Referring to FIG. 5, in the first region R1 of one pixel area of the liquid crystal display according to the present exemplary embodiment, the second subregion 191a2 of the first subpixel electrode 191a and the common electrode 270 generate the electric field. As above, the second subregion 191a2 of the first subpixel electrode 191a includes a cross-shaped stem and a plurality of first branch electrodes extending in four different directions. The plurality of first branch electrodes may be inclined with an angle of about 40 degrees to about 45 degrees with respect to the gate line 121. When a fringe field is generated at the edge of the plurality of first branch electrodes, the liquid crystal molecules of the liquid crystal layer 3 positioned at the first region R1 are inclined in four different directions. In detail, the horizontal component of the fringe field generated by the plurality of first branch electrodes is parallel to the edge of the plurality of first branch electrodes, such that the liquid crystal molecules are oriented in the length direction parallel to the plurality of first branch electrodes.

Referring to FIG. 6, in the second region R2 of one pixel area of the liquid crystal display according to the present exemplary embodiment, the third subregion of the second subpixel electrode 191b and the first subregion 191a1 of the first subpixel electrode 191a overlap each other. Accordingly, the liquid crystal molecules of the liquid crystal layer 3 are arranged according to the electric field formed between the third subregion of the second subpixel electrode 191b and the common electrode 270, the electric field formed between the part of the first subregion 191a1 that is exposed between the plurality of second branch electrodes of the third subregion of the second subpixel electrode 191b and the common electrode 270, and the electric field formed between the third subregion of the second subpixel electrode 191b and the first subregion 191a1 of the first subpixel electrode 191a.

Next, referring to FIG. 7, in the third region R3 of one pixel area of the liquid crystal display according to the present exemplary embodiment, the fourth subregion of the second subpixel electrode 191b and the common electrode 270 together generate the electric field. At this time, a portion of the fourth subregion of the second subpixel electrode 191b has a plate shape and the remaining portion has a plurality of third branch electrodes. Thus, through the plate shape of the second subpixel electrode 191b, the transmittance of the liquid crystal display may be increased. The liquid crystal molecules positioned corresponding to the portion of the second subpixel electrode 191b having the plate shape are inclined by the fringe field formed by the plurality of second branch electrodes and the plurality of third branch electrodes in different directions, such that the liquid crystal molecules are slanted in the length direction of the plurality of second branch electrodes and the plurality of third branch electrodes.

As described above, the magnitude of the second voltage applied to the second subpixel electrode 191b is smaller than the magnitude of the first voltage applied to the first subpixel electrode 191a.

Accordingly, the intensity of the electric field applied to the liquid crystal layer positioned at the first region R1 is largest and the intensity of the electric field applied to the liquid crystal layer positioned at the third region R3 is smallest. The second region R2 is influenced by the electric field of the first subpixel electrode 191a positioned under the second subpixel electrode 191b, such that the intensity of the electric field applied to the liquid crystal layer positioned at the second region R2 is smaller than the intensity of the electric field applied to the liquid crystal layer positioned at the first region R1, and is larger than the intensity of the electric field applied to the liquid crystal layer positioned at the third region R3.

As described above, one pixel area of the liquid crystal display according to an exemplary embodiment of the present invention is divided into a first region where a first subpixel electrode has a relatively high first voltage, a second region where the portion of the first subpixel electrode with the relatively high first voltage and a portion of the second subpixel electrode having a relatively low second voltage overlap each other via an insulating layer interposed therebetween, and a third region where the second subpixel electrode with the relatively low second voltage is positioned. Accordingly, the intensities of the electric field applied to the liquid crystal molecules corresponding to the first region, the second region, and the third region are different such that the inclination angles of the liquid crystal molecules are different, thereby realizing a different luminance for each region. By dividing one pixel area into three regions of differing luminances, the change in transmittance according to gray shade may be made smoother, thereby preventing a sharp change of transmittance due to a gray change from a low gray to a high gray at the side, while making the lateral visibility approximately the same as the front visibility. Accordingly, gray expression in low gray and high gray is improved.

Figure 8:
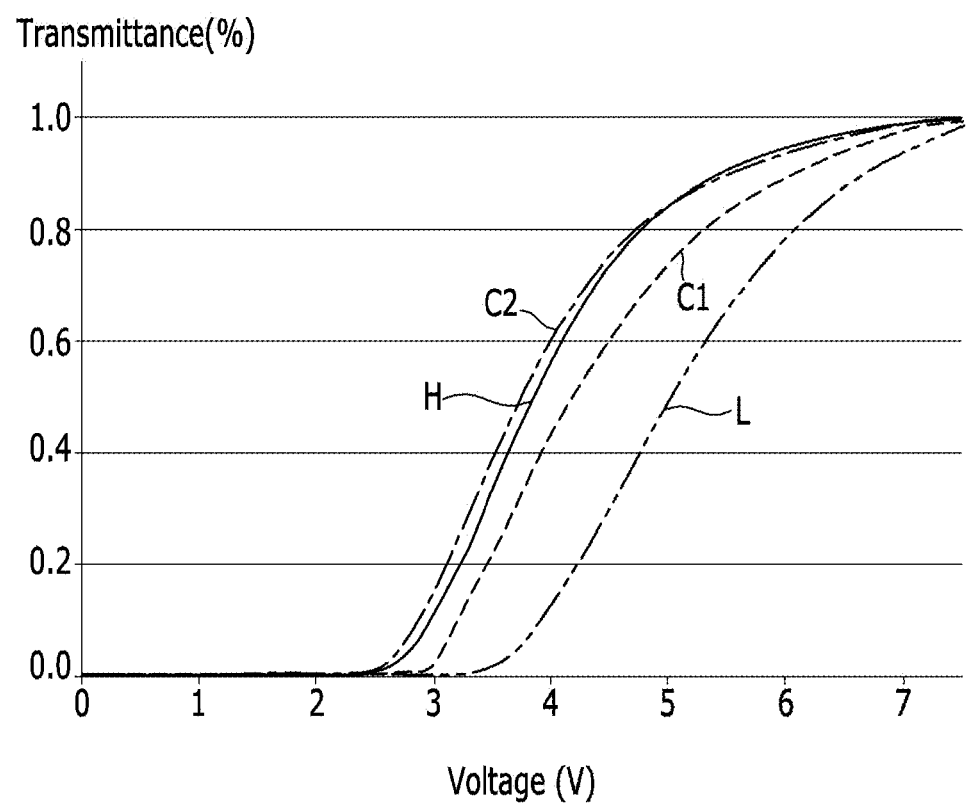
FIG. 8 is a graph of a transmittance according to a voltage in a liquid crystal display according to an experimental example of the present invention.

Next, a liquid crystal display according to one experimental example of the present invention will be described with reference to FIG. 8. FIG. 8 is a graph of a transmittance according to a voltage in a liquid crystal display according to experiment carried out on embodiments of the present invention.

In the present experimental example, like the liquid crystal display according to an exemplary embodiment of the present invention, for a case that the intensity of the voltage applied to the second subpixel electrode 191*b* is smaller than the voltage applied to the first subpixel electrode 191*a* and a case that the intensity of the voltage applied to the second subpixel electrode 191*b* is larger than the voltage applied to the first subpixel electrode 191*a*, a transmittance(H) according to the voltage of the first region R1, a transmittance(L) according to the voltage of the third region R3, and transmittance(C1 and C2) according to the voltage of the second region R2 are measured and are shown as a graph.

Referring to FIG. 8, like the liquid crystal display according to an exemplary embodiment of the present invention, in the case in which the intensity of the voltage applied to the second subpixel electrode 191*b* is smaller than the voltage applied to the first subpixel electrode 191*a*, the curve of the transmittance C1 according to the voltage of the second region R2 is positioned between the curve of the transmittance H according to the voltage of the first region R1 and the curve of the transmittance L according to the voltage of the third region R3. However, in the case C2 in which the intensity of the voltage applied to the second subpixel electrode 191*b* is larger than the intensity of the voltage applied to the first subpixel electrode 191*a*, referring to the curve of the transmittance C2 according to the voltage of the second region R2, the transmittance value for the voltage of the second region R2 is slightly larger than the transmittance value according to the voltage of the first region R1, and the difference is small.

Like the liquid crystal display according to an exemplary embodiment of the present invention, the portion of the first subpixel electrode 191*a* with a relatively high applied voltage is disposed under the second region R2 and the portion of the second subpixel electrode 191*b* with a relatively low applied voltage is disposed on the second region R2. Thus, it may be confirmed that three regions having different transmittance may exist for the same applied voltage, and the transmittance change of the three regions may be sequentially generated. That is, in the case of the liquid crystal display according to an exemplary embodiment of the present invention, one pixel area is divided into three regions having different luminance that are sequentially changed.

Also, at least two of the first region, the second region, and the third region at least partially overlap each other. In particular, a portion of the first subpixel electrode having the first applied voltage and the portion of the second subpixel electrode having the second applied voltage are overlapped such that the transmittance deterioration generated in the region between the first subpixel electrode and the second subpixel electrode may be prevented, thereby increasing the overall transmittance.

Figure 9:
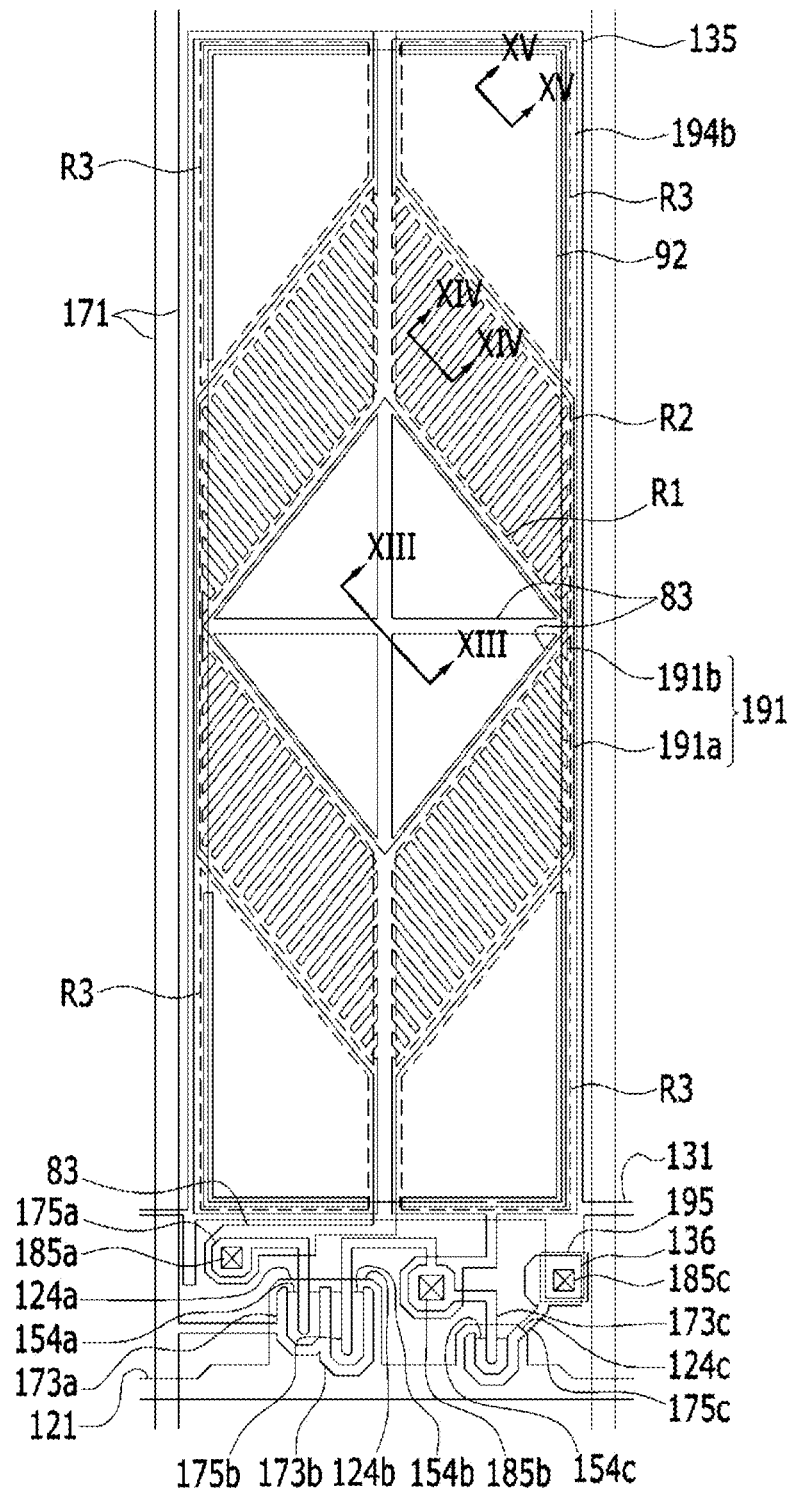
FIG. 9 is a layout view of the liquid crystal display according to another exemplary embodiment of the present invention.
Figure 10:
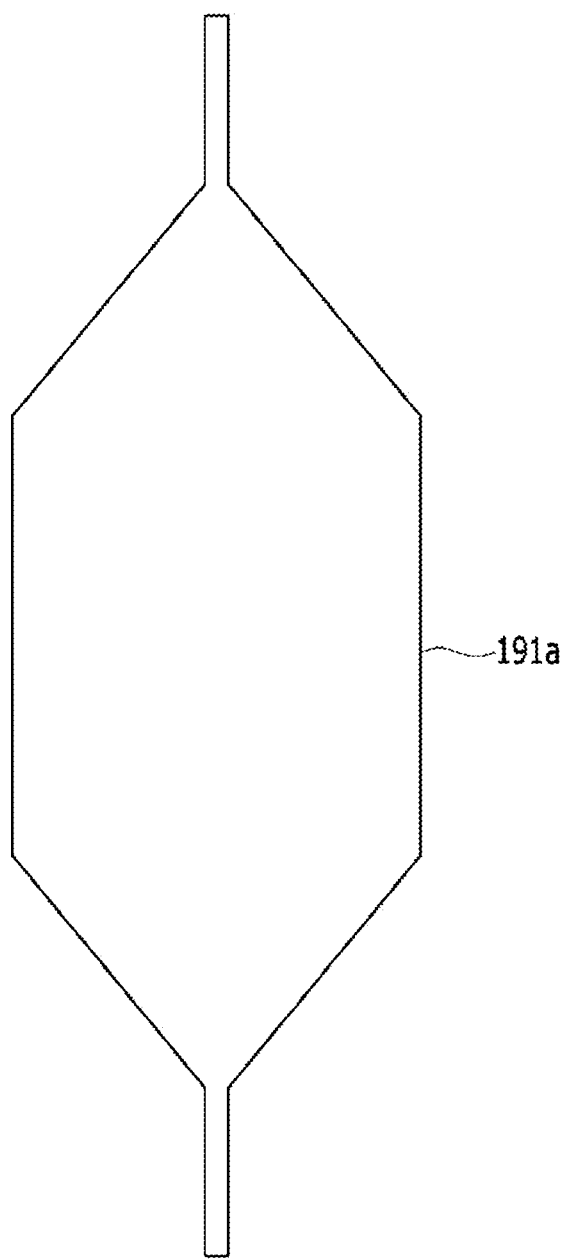
FIG. 10 is a layout view of the first subpixel electrode of the liquid crystal display of FIG. 9.
Figure 11:
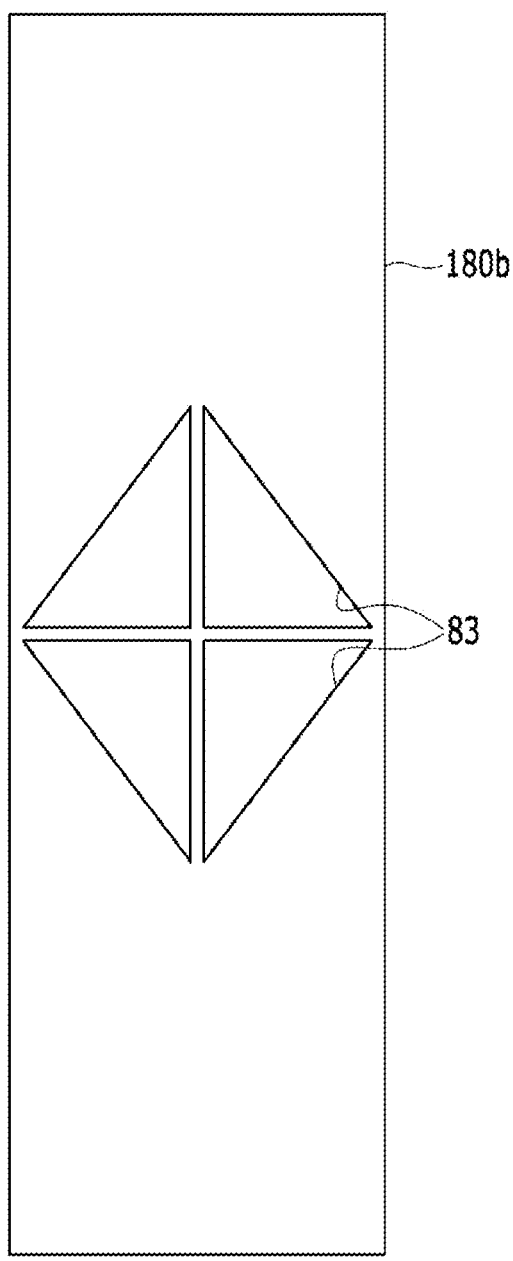
FIG. 11 is a layout view of a portion of the first subpixel electrode and the second subpixel electrode of the liquid crystal display of FIG. 9.
Figure 12:
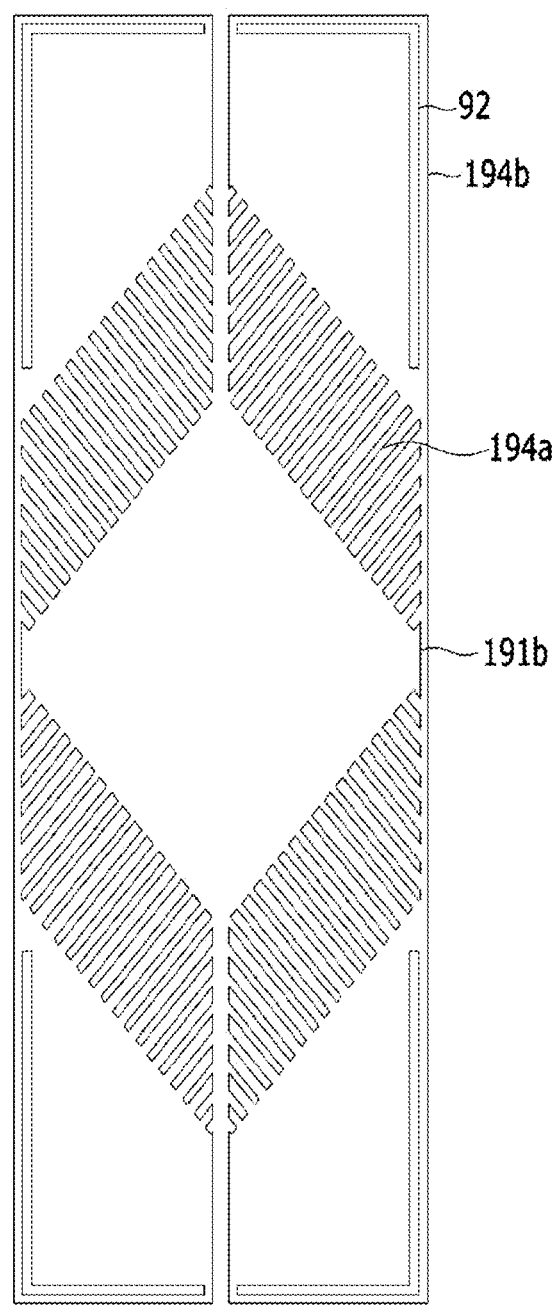
FIG. 12 is a layout view of the second subpixel electrode of the liquid crystal display of FIG. 9.
Figure 13:
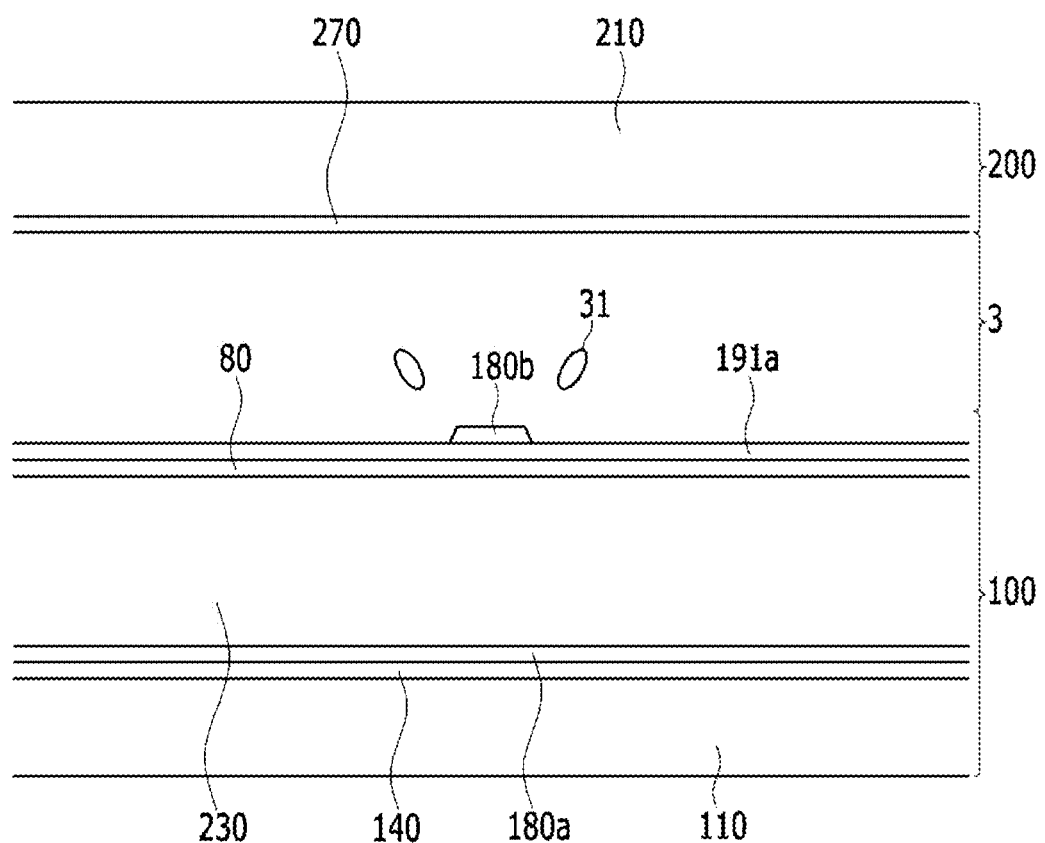
FIG. 13 is a cross-sectional view of the liquid crystal display of FIG. 9 taken along the line XIII-XIII.
Figure 14:
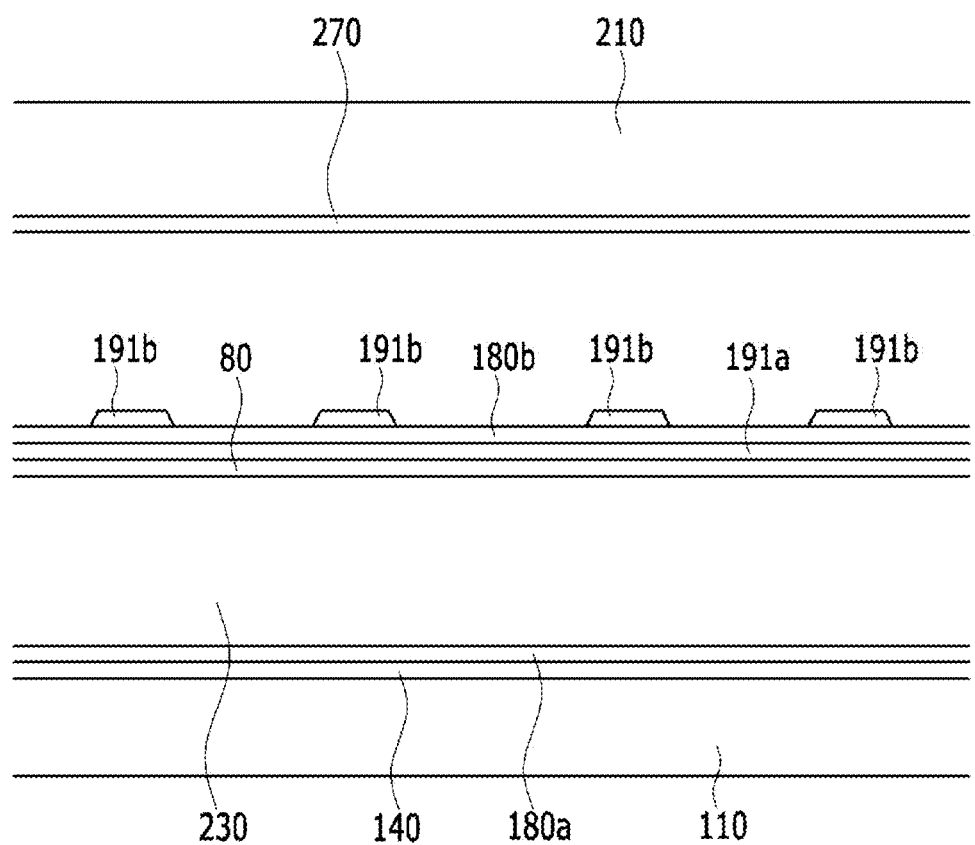
FIG. 14 is a cross-sectional view of the liquid crystal display of FIG. 9 taken along the line XIV-XIV.
Figure 15:
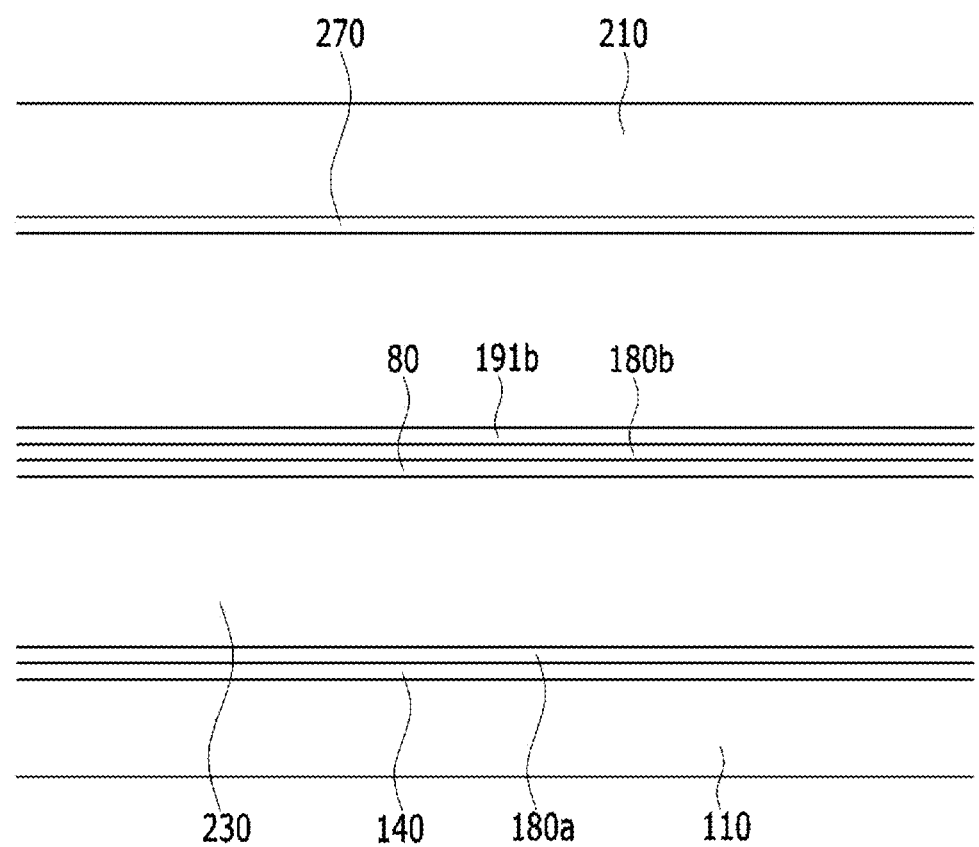
FIG. 15 is a cross-sectional view of the liquid crystal display of FIG. 9 taken along the line XV-XV.

Next, a liquid crystal display according to another exemplary embodiment of the present invention will be described with reference to FIG. 9 to FIG. 15. FIG. 9 is a layout view of the liquid crystal display according to another exemplary embodiment of the present invention. FIG. 10 is a layout view of the first subpixel electrode of the liquid crystal display of FIG. 9. FIG. 11 is a layout view of a portion of the first subpixel electrode and the second subpixel electrode of the liquid crystal display of FIG. 9. FIG. 12 is a layout view of the second subpixel electrode of the liquid crystal display of FIG. 9. FIG. 13 is a cross-sectional view of the liquid crystal display of FIG. 9 taken along the line XIII-XIII. FIG. 14 is a cross-sectional view of the liquid crystal display of FIG. 9 taken along the line XIV-XIV. FIG. 15 is a cross-sectional view of the liquid crystal display of FIG. 9 taken along the line XV-XV.

Referring to FIG. 9 to FIG. 15, the liquid crystal display according to the present exemplary embodiment is similar to the liquid crystal display according to the exemplary embodiment described with reference to FIG. 1 to FIG. 7. Detailed description of the same reference numerals is omitted for brevity and clarity.

In the liquid crystal display according to the present exemplary embodiment, like the liquid crystal display according to the exemplary embodiment described with reference to FIG. 1 to FIG. 7, one pixel area is divided into a first region R1 where the first subpixel electrode that receives a relatively high first voltage is positioned, a second region R2 where the portion of the first subpixel electrode and the portion of the second subpixel electrode each receive a relatively low second voltage and overlap each other via the insulating layer interposed therebetween, as well as a third region R3 where the second subpixel electrode receives a relatively low second voltage. The area of the second region R2 may be about two times the area of the first region R1, and the area of the third region R3 may be about two times the area of the second region R2.

Referring to FIG. 9 and FIG. 10, in the liquid crystal display according to the present exemplary embodiment, differently from the liquid crystal display according to the exemplary embodiment described with reference to FIG. 1 to FIG. 7, the first subpixel electrode 191*a* is not divided into the first subregion 191*a*1 and the second subregion 191*a*2. Also, the first subpixel electrode 191*a* has a plate or flat, planar shape mainly positioned at the center portion of the pixel.

Also, referring to FIG. 11 along with FIG. 9, the second passivation layer 180*b* is an insulating layer positioned between the first subpixel electrode 191*a*, and the second subpixel electrode 191*b* has a plurality of openings 83. The plurality of openings 83 has a grouped shape in which four right triangles are positioned at the center and are gathered together so that their shorter sides all face inward toward each other, thereby collectively creating an outer shape similar to a rhombus.

Referring to FIG. 13, in the first region R1 of the liquid crystal display according to the present exemplary embodiment, the first subpixel electrode 191a positioned at the lower panel 100 and having a relatively high first applied voltage, together with the common electrode 270 positioned at the upper panel 200, act to generate the electric field. At this time, the liquid crystal molecules are inclined in four different directions by the openings 83 formed in the second passivation layer 180b. In detail, referring to FIG. 9, FIG. 10, FIG. 11, and FIG. 13, because of the plurality of openings 83 formed in the second passivation layer 180b, liquid crystal molecules 31 positioned on the first subpixel electrode 191a are inclined in directions perpendicular to the edges of the openings 83.

Referring to FIG. 12 along with FIG. 9, the third subregion of the second subpixel electrode 191b, which overlaps the first subpixel electrode 191a, includes a plurality of second branch electrodes 194a extending in four directions. However, a fourth subregion 194b of the second subpixel electrode 191b that does not overlap the first subpixel electrode 191a has a flat, plate-type shape and has a cutout 92 formed along its outer edge, and along the edge of the pixel area. The liquid crystal molecules positioned near the fourth subregion 194b are influenced by the liquid crystal molecules positioned corresponding to the third subregion of the second subpixel electrode 191b, and are thus inclined in directions parallel to the length directions of the second branch electrodes 194a. In other words, liquid crystal molecules in this area are influenced by the fringe filed formed by the outer edge of the second subpixel electrode 191b, thereby being inclined in directions parallel to the length directions of the second branch electrodes.

At this time, the cutout 92 formed along with the edge of the second subpixel electrode 191b reduces the influence of the fringe field formed at the edge of the second subpixel electrode 191b, so that the liquid crystal molecules positioned at the edge of the pixel area are prevented from being inclined in directions vertical to the edge of the pixel area. Thereby, the liquid crystal molecules positioned at the edge of the pixel area are inclined in directions parallel to the length direction of the second branch electrodes. Accordingly, transmittance reduction may be prevented or ameliorated.

Referring to FIG. 14, in the second region R2 of one pixel area of a liquid crystal display according to the present exemplary embodiment, the third subregion of the second subpixel electrode 191b overlaps a portion of the first subpixel electrode 191a. Accordingly, the liquid crystal molecules of the liquid crystal layer 3 are arranged according to the influence of each of (1) the electric field formed between the third subregion of the second subpixel electrode 191b and the common electrode 270, (2) the electric field formed between the common electrode 270 and the first subpixel electrode 191a positioned between the plurality of second branch electrodes of the third subregion of the second subpixel electrode 191b, and (3) the electric field formed between the third subregion of the second subpixel electrode 191b and the first subpixel electrode 191a.

Next, referring to FIG. 15, in the third region R3 of one pixel area of a liquid crystal display according to the present exemplary embodiment, the second subpixel electrode 191b positioned at the lower panel 100 and the common electrode 270 positioned at the upper panel 200 together generate the electric field.

As described above, one pixel area of a liquid crystal display according to an exemplary embodiment of the present invention is divided into a first region where the first subpixel electrode is present but not the second subpixel electrode and the first subpixel electrode is to have a relatively high first voltage applied, a second region where a portion of the first subpixel electrode and a portion of the second subpixel electrode overlap each other and are to have a relatively low second voltage applied, and a third region where the second subpixel electrode is present but not the first subpixel electrode and the second subpixel electrode is to have a relatively low second voltage applied. Accordingly, the intensities of the electric field applied to the liquid crystal molecules corresponding to the first region, the second region, and the third region are different, such that the inclination angles of the liquid crystal molecules are different, thereby realizing a different luminance for each region. In this manner, by dividing one pixel area into three regions of differing luminances, the change in transmittance according to gray value may be made smoother. By preventing sharp change in transmittance according to gray change in the low gray and the high gray at the side, while approximating the lateral visibility to the front visibility, the gray expression in the low gray and the high gray is improved.

Also, the first region, the second region, and the third region of one pixel area are not separated from each other, and the portion of the first subpixel electrode applied with the first voltage and the portion of the second subpixel electrode applied with the second voltage are overlapped such that transmittance deterioration generated in the region between the first subpixel electrode and the second subpixel electrode may be prevented, thereby increasing the overall transmittance.

Many characteristics of the liquid crystal display according to the exemplary embodiment described with reference to FIG. 1 to FIG. 7 may be applied to the liquid crystal display according to the present exemplary embodiment.

Figure 16:
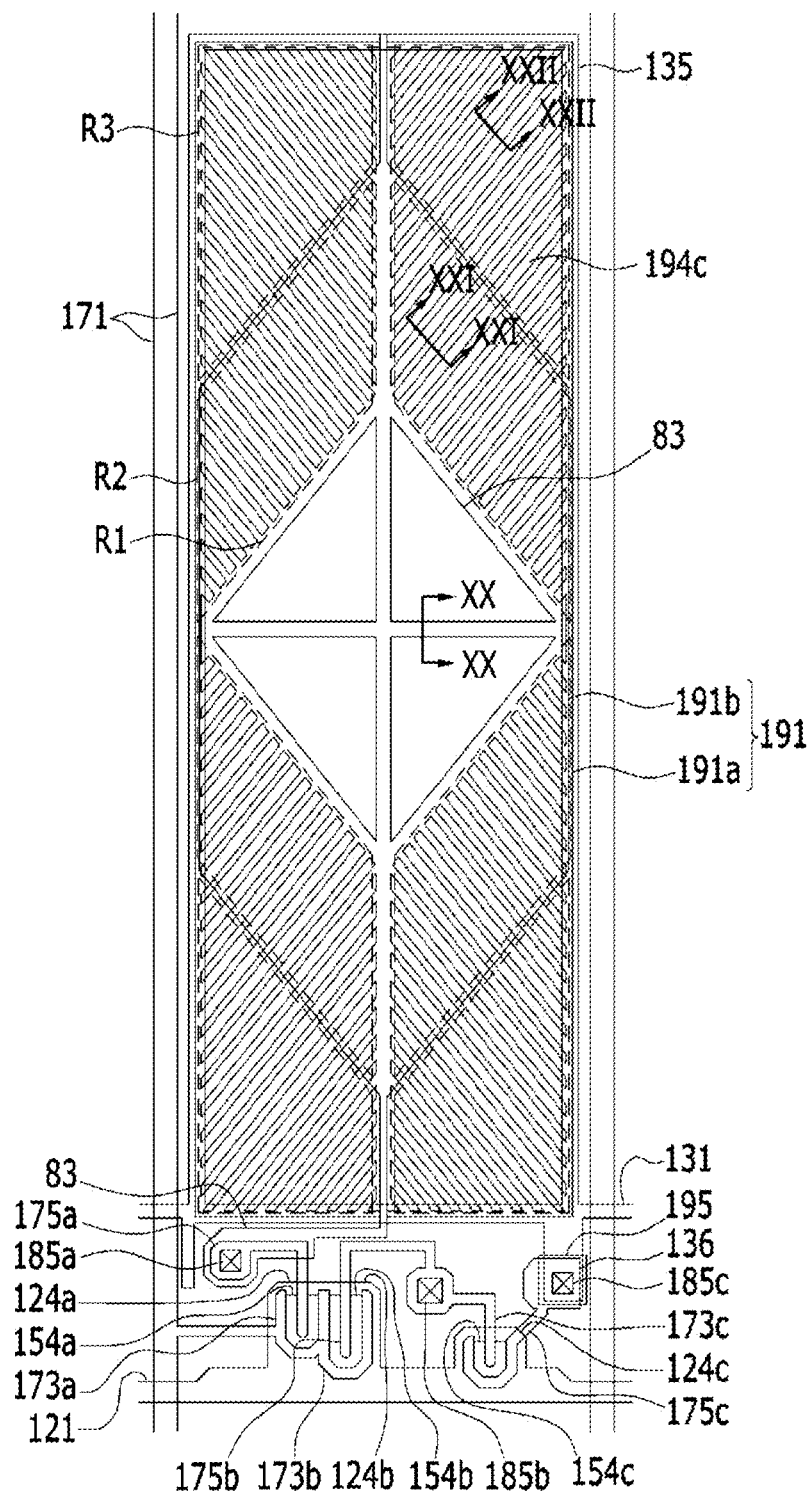
FIG. 16 is a layout view of the liquid crystal display according to another exemplary embodiment of the present invention.
Figure 17:
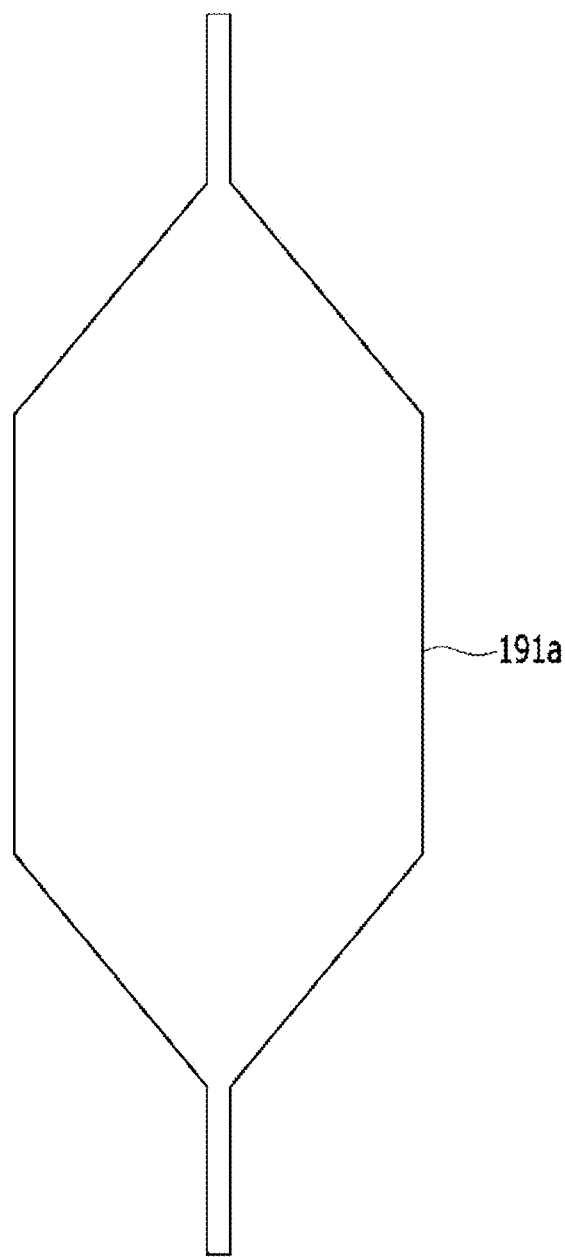
FIG. 17 is a layout view of the first subpixel electrode of the liquid crystal display of FIG. 16.
Figure 18:
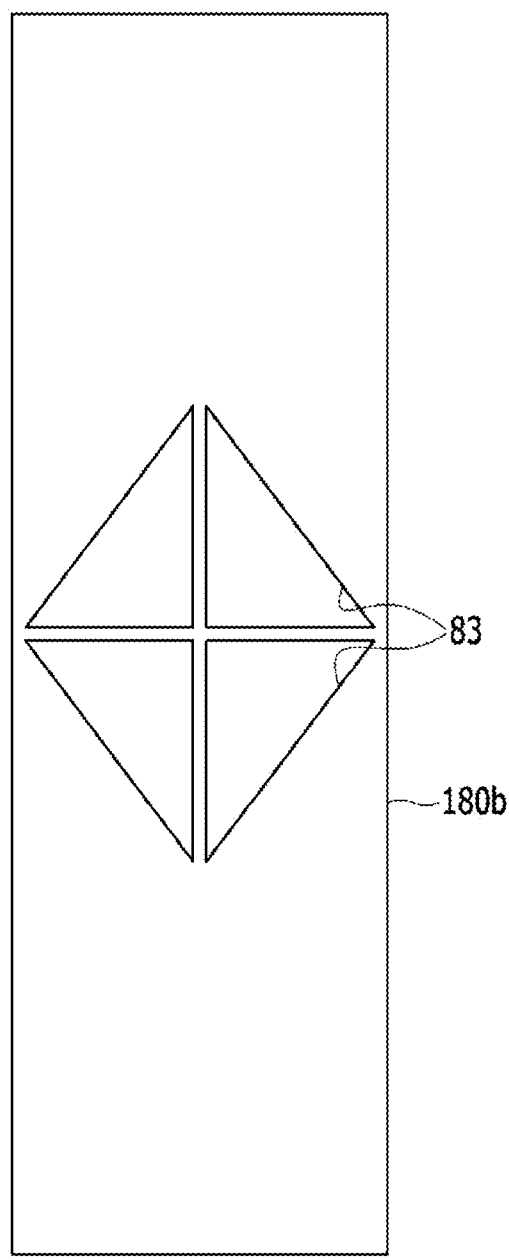
FIG. 18 is a layout view of a portion of an insulating layer of the liquid crystal display of FIG. 16.
Figure 19:
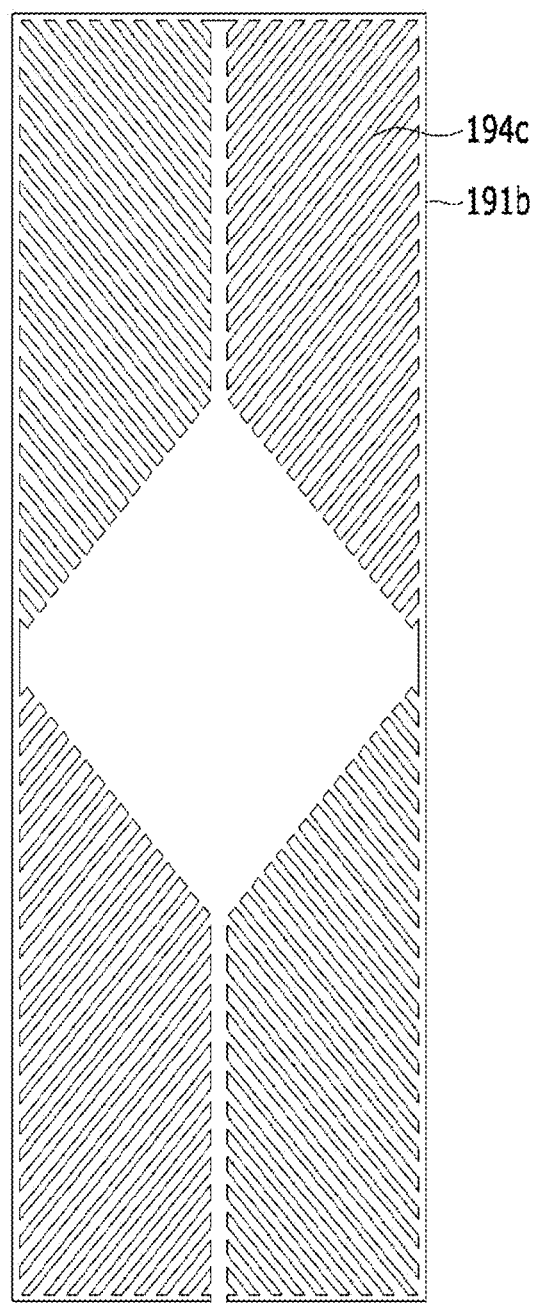
FIG. 19 is a layout view of the second subpixel electrode of the liquid crystal display of FIG. 16.
Figure 20:
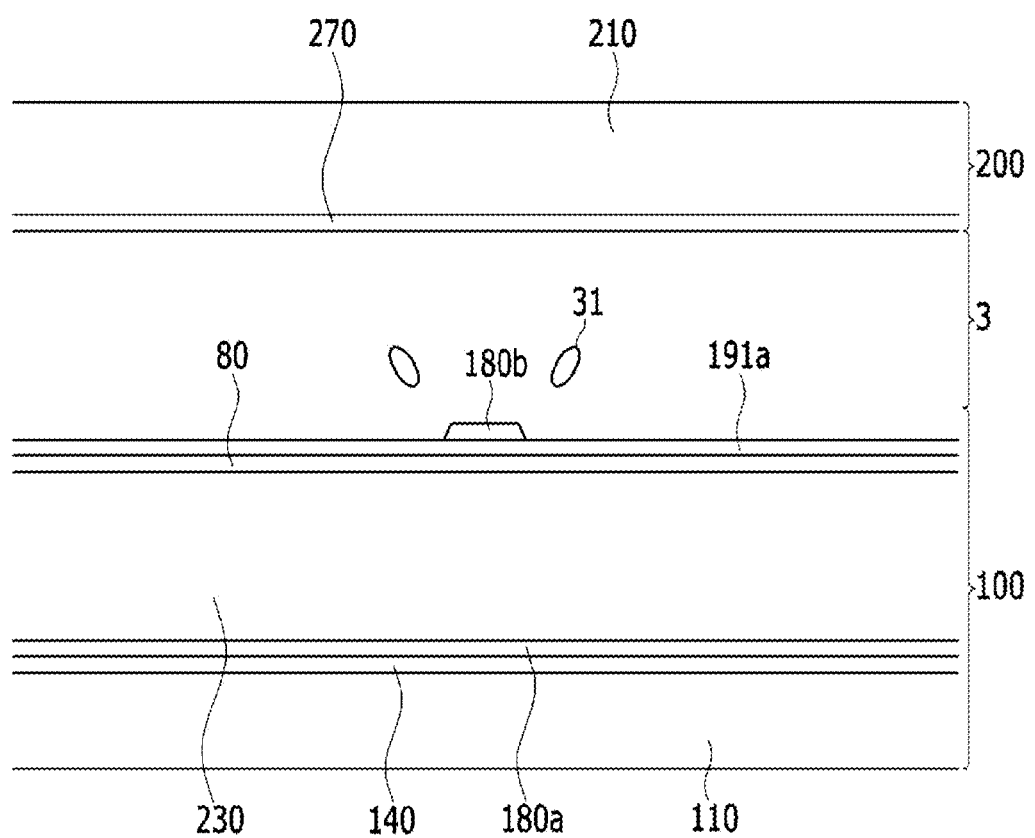
FIG. 20 is a cross-sectional view of the liquid crystal display of FIG. 16 taken along the line XX-XX.
Figure 21:
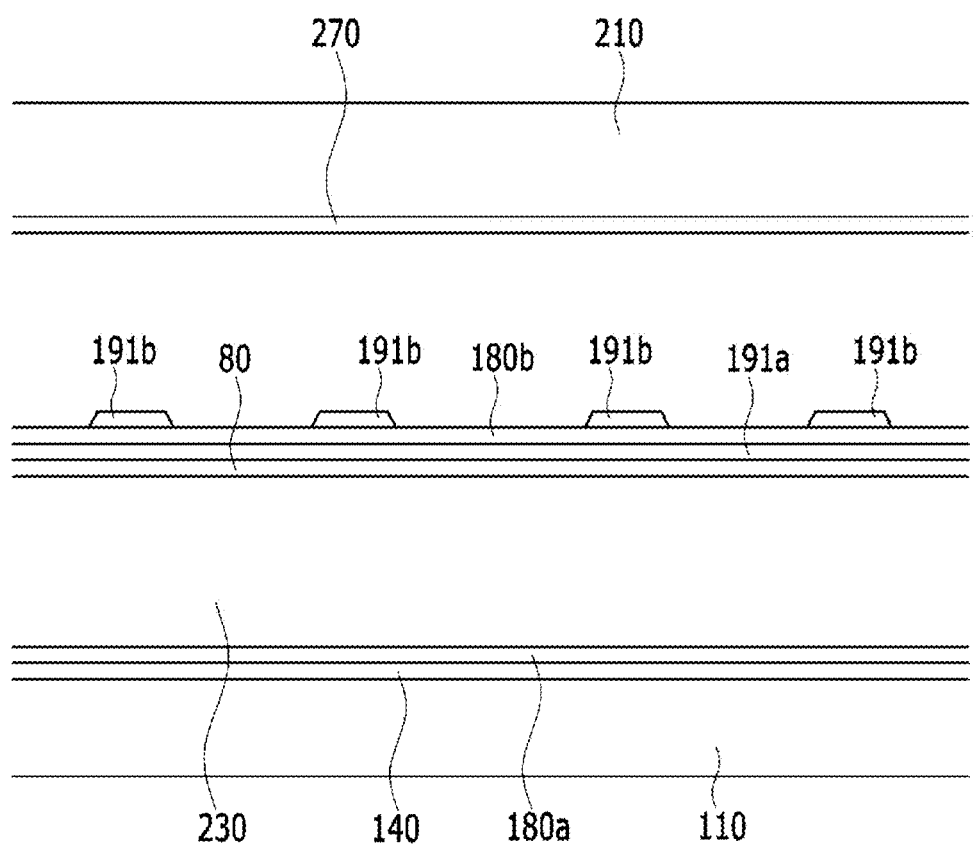
FIG. 21 is a cross-sectional view of the liquid crystal display of FIG. 16 taken along the line XXI-XXI.
Figure 22:
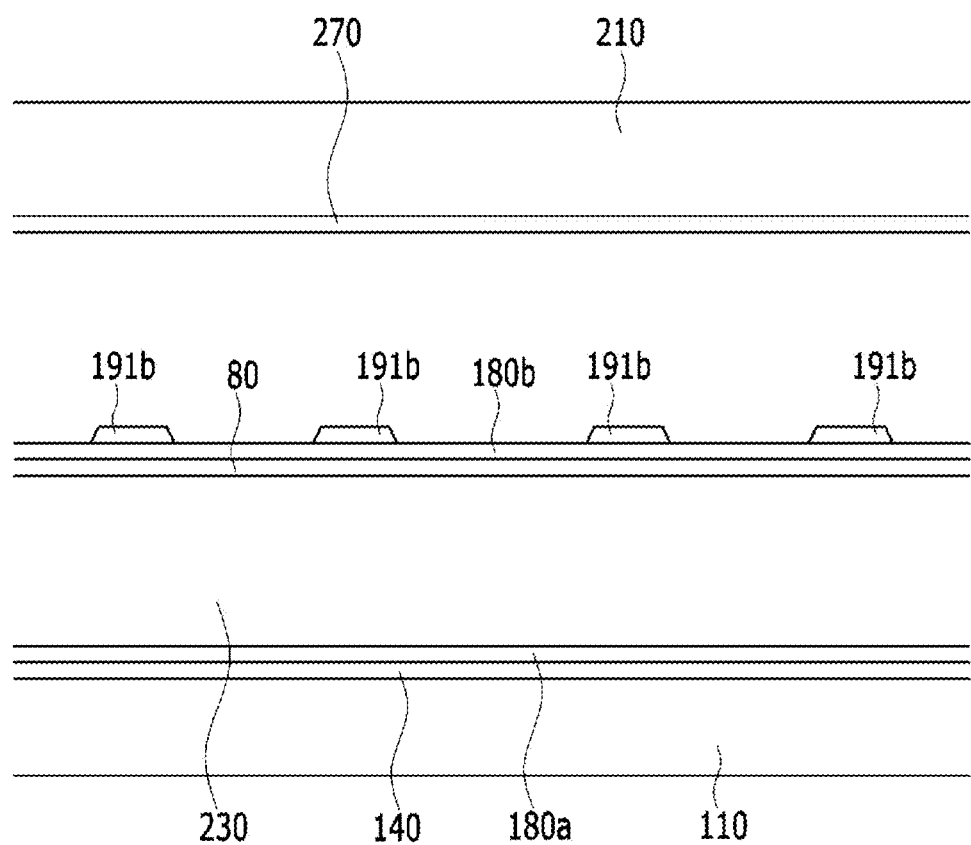
FIG. 22 is a cross-sectional view of the liquid crystal display of FIG. 16 taken along the line XXII-XXII.

Next, a liquid crystal display according to another exemplary embodiment of the present invention will be described with reference to FIG. 16 to FIG. 22. FIG. 16 is a layout view of the liquid crystal display according to another exemplary embodiment of the present invention. FIG. 17 is a layout view of the first subpixel electrode of the liquid crystal display of FIG. 16. FIG. 18 is a layout view of a portion of an insulating layer of the liquid crystal display of FIG. 16. FIG. 19 is a layout view of the second subpixel electrode of the liquid crystal display of FIG. 16. FIG. 20 is a cross-sectional view of the liquid crystal display of FIG. 16 taken along the line XX-XX. FIG. 21 is a cross-sectional view of the liquid crystal display of FIG. 16 taken along the line XXI-XXI. FIG. 22 is a cross-sectional view of the liquid crystal display of FIG. 16 taken along the line XXII-XXII.

Referring to FIG. 16 to FIG. 22, a liquid crystal display according to the present exemplary embodiment is similar to the liquid crystal display according to the exemplary embodiment described with reference to FIG. 1 to FIG. 7 and the liquid crystal display according to the exemplary embodiment described with reference to FIG. 9 to FIG. 15. The detailed description for identical reference numerals is thus omitted.

In the liquid crystal display according to the present exemplary embodiment, like the liquid crystal display according to the exemplary embodiment described with reference to FIG. 1 to FIG. 7, one pixel area is divided into a first region R1 where the first subpixel electrode receives a relatively high first voltage, the second region R2 where a portion of the first subpixel electrode and an overlapping portion of the second subpixel electrode receive a relatively low second voltage, and the third region R3 where the second subpixel electrode also receives the relatively low second voltage. The area of the second region R2 may be about two times the area of the first region R1, and the area of the third region R3 may be about two times the area of the second region R2.

Referring to FIG. 16 and FIG. 17, in a liquid crystal display according to the present exemplary embodiment, differently from the liquid crystal display according to the exemplary embodiment described with reference to FIG. 1 to FIG. 7, the first subpixel electrode 191a is not divided into a first subregion 191a1 and a second subregion 191a2, and the first subpixel electrode 191a has a shape when viewed in plan view, where this shape is mainly positioned at the center portion of the pixel.

Referring to FIG. 18 along with FIG. 16, in a liquid crystal display according to the present exemplary embodiment, like the exemplary embodiment shown in FIG. 9 to FIG. 15, the second passivation layer 180b is an insulating layer positioned between the first subpixel electrode 191a and the second subpixel electrode 191b, and has a plurality of openings 83. The plurality of openings 83 have a grouped shape in which four right triangles are positioned at the center and are gathered together with their shorter sides facing each other, so that their collective outer shape is similar to a rhombus.

Referring to FIG. 19 along with FIG. 16, the second subpixel electrode 191b of the liquid crystal display according to the present exemplary embodiment has a plurality of fourth branch electrodes 194c in the region overlapping the first subpixel electrode 191a, as well as extending to the outer edges of electrode 191b. Accordingly, in addition to the second region R2 where the first subpixel electrode 191a and the second subpixel electrode 191b overlap, the liquid crystal molecules positioned at the third region R3 where only the second subpixel electrode 191b is positioned are all inclined parallel to the length direction of the fourth branch electrode by the influence of the fringe field formed by the fourth branch electrodes.

Referring to FIG. 20, in the first region R1 of a liquid crystal display according to the present exemplary embodiment, the first subpixel electrode 191a and the common electrode 270 collectively generate an electric field. At this time, the liquid crystal molecules are inclined in four different directions by the openings 83 formed in the second passivation layer 180b. In detail, referring to FIG. 15, FIG. 16, FIG. 17, and FIG. 19, the liquid crystal molecules 31 positioned on the first subpixel electrode 191a are inclined perpendicular to the edge of the openings 83, and thereby the inclination directions of the liquid crystal molecules 31 are different in the different regions of the pixel.

Referring to FIG. 21, in the second region R2 of one pixel area of a liquid crystal display according to the present exemplary embodiment, the illustrated portion of the second subpixel electrode 191b overlaps the shown portion of the first subpixel electrode 191a. Accordingly, nearby liquid crystal molecules of the liquid crystal layer 3 are oriented by the electric field formed between the second subpixel electrode 191b and the common electrode 270, the electric field formed between the first subpixel electrode 191a positioned between the plurality of fourth branch electrodes of the second subpixel electrode 191b and the common electrode 270, and the electric field formed between the plurality of fourth branch electrodes of the second subpixel electrode 191b and the first subpixel electrode 191a.

Referring to FIG. 22, in the third region R3 of one pixel area of a liquid crystal display according to the present exemplary embodiment, the second subpixel electrode 191b positioned at the lower panel 100 and the common electrode 270 positioned at the upper panel 200 together generate the electric field.

As described above, one pixel area of a liquid crystal display according to an exemplary embodiment of the present invention is divided into a first region where the first subpixel electrode is present and receives a relatively high first voltage, a second region where a portion of the first subpixel electrode overlaps portion of the second subpixel electrode and each receives a relatively low second voltage, and a third region where the second subpixel electrode is present and receives the relatively low second voltage. Accordingly, the intensities of the electric field applied to the liquid crystal molecules corresponding to the first region, the second region, and the third region are different, so that the inclination angles of the liquid crystal molecules are different, thereby creating a different luminance for each region. Thus, by dividing one pixel area into three regions having different luminances, the change in transmittance according to gray value may be made smoother. By preventing sharp change in transmittance according to gray change in the low gray and the high gray at the side, while approximating the lateral visibility to the front visibility, the gray expression in the low gray and the high gray is improved.

Also, the first region, the second region, and the third region of one pixel area are not separated from each other, and the portion of the first subpixel electrode applied with the first voltage overlaps the portion of the second subpixel electrode applied with the second voltage, such that the transmittance deterioration generated in the region between the first subpixel electrode and the second subpixel electrode may be prevented, thereby increasing the overall pixel transmittance.

Many characteristics of a liquid crystal display according to the exemplary embodiment described with reference to FIG. 1 to FIG. 7 and a liquid crystal display according to the exemplary embodiment described with reference to FIG. 9 to FIG. 15 may be applied to a liquid crystal display according to the present exemplary embodiment.

Figure 23:
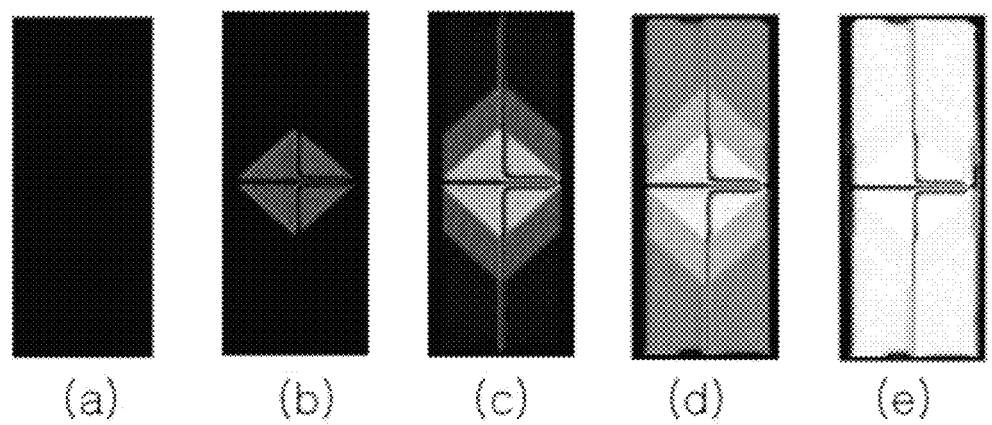
FIG. 23 to FIG. 25 are electron microscopy pictures showing a brightness change of the liquid crystal display according to an experimental example of the present invention.
Figure 24:
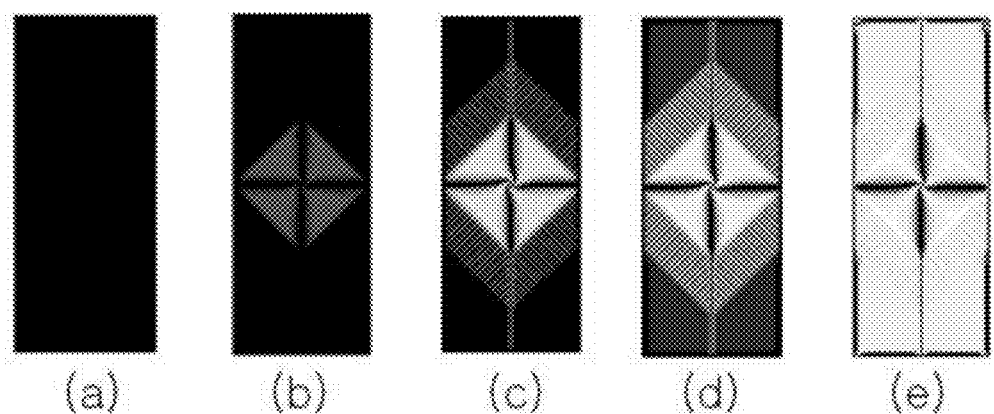
Figure 25:
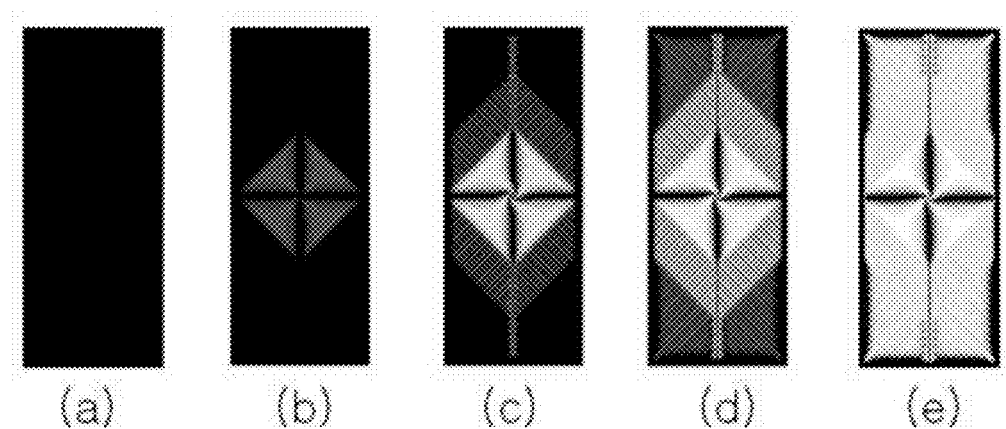

Next, a brightness change of the liquid crystal display according to an experimental example of the present invention will be described with reference to FIG. 23 to FIG. 25. FIG. 23 to FIG. 25 are electron microscopy pictures showing a brightness change of the liquid crystal display according to an experimental display constructed according to embodiments of the present invention.

In the present experimental example, after forming a liquid crystal display according to the exemplary embodiment shown in FIG. 1, FIG. 9, and FIG. 16, while changing the intensity of the electric field applied to the liquid crystal layer, the brightness of one pixel was measured by electron microscopy.

FIG. 23 shows a result for a liquid crystal display constructed according to the exemplary embodiment shown in FIG. 1, FIG. 24 shows a result for a liquid crystal display constructed according to the exemplary embodiment shown in FIG. 9, and FIG. 25 shows a result for a liquid crystal display constructed according to the exemplary embodiment shown in FIG. 16.

Referring to FIG. 23 to FIG. 25, for a liquid crystal display according to an exemplary embodiment of the present invention, as the intensity of the electric field applied to the liquid crystal layer is increased, the brightness is increased in the first, second, and third regions sequentially. Also, the transmittance change of the first region, the second region, the third region is readily seen.

In this manner, by forming different subregions having three different transmittances, the lateral visibility may be controlled to be close to the front visibility.

Figure 26:
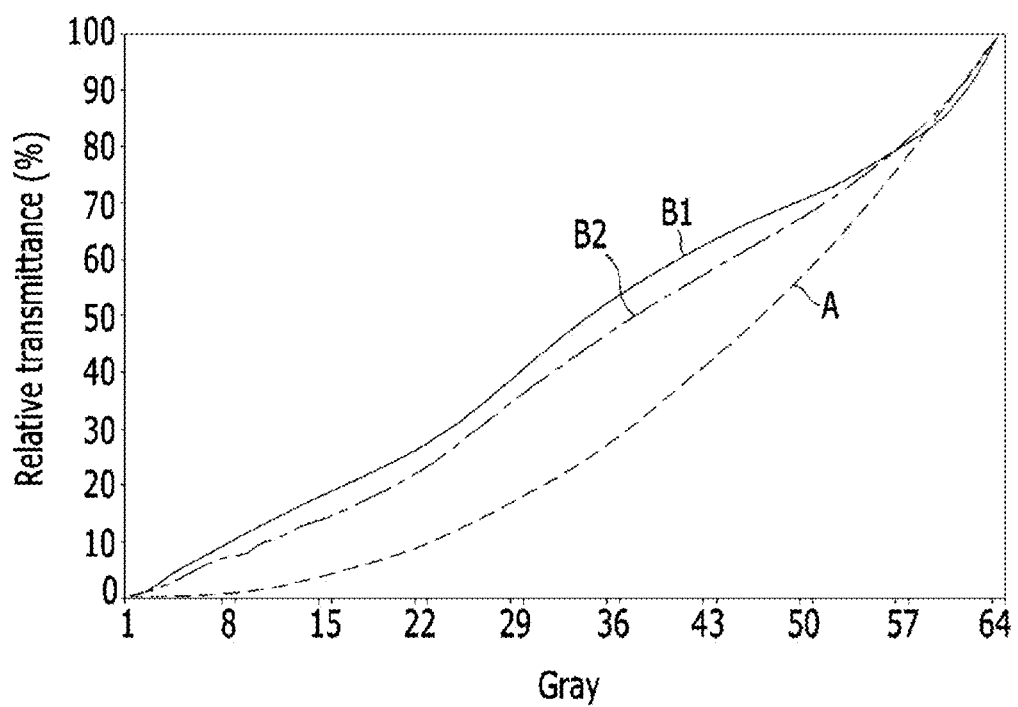
FIG. 26 is a graph of a transmittance change according to a voltage in a liquid crystal display according to another experimental example of the present invention.

Next, a transmittance change according to a voltage for a liquid crystal display according to another experimental example of the present invention will be described with reference to FIG. 26. FIG. 26 is a graph of transmittance change according to a voltage in a liquid crystal display according to another experimental example of the present invention.

In the present experimental example, for a first case in which one pixel area is divided into a region occupied by a first subpixel electrode and a region occupied by a second subpixel electrode as in conventional liquid crystal displays, and a second case in which one pixel area is divided into three regions as in the embodiments described above, a transmittance change A according to gray seen in the front of the liquid crystal display and transmittance changes B1 and B2 according to gray seen at a side of the liquid crystal display are compared. In FIG. 26, the transmittance change according to gray seen at the side of the liquid crystal display for the first case is indicated by B1, and the transmittance change according to gray at the side of the liquid crystal display for the second case is indicated by B2.

Referring to FIG. 26, the curve B2 is closer to curve A than is curve B1. That is, the transmittance at the sides of the three-region pixel areas of embodiments of the invention more closely resembles the transmittance at the front of a display than does the transmittance at the sides of conventional two-region pixel areas. Particularly, the three-region display can be seen to exhibit a more smoothly increasing transmittance than the two-region display, with a more gradual increase in transmittance at both low and high gray values. Thus, in liquid crystal displays according to an exemplary embodiment of the present invention, the transmittance change as a function of gray value is made smoother, such that more correct gray expression is possible. Accordingly, a liquid crystal display according to an exemplary embodiment of the present invention may prevent or reduce the deterioration of the display quality at higher viewing angles and/or high and low gray values.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a first subpixel electrode positioned on the first substrate and configured to receive a first voltage;
a second subpixel electrode positioned on the first substrate and configured to receive a second voltage;
an insulating layer positioned between the first subpixel electrode and the second subpixel electrode;
a second substrate facing the first substrate; and
a common electrode positioned on the second substrate,
wherein a portion of the first subpixel electrode and a portion of the second subpixel electrode overlap each other with the insulating layer interposed therebetween, so as to form an area of overlap,
wherein the portion of the second subpixel electrode includes a plurality of branch electrodes,
wherein, in the area of overlap, a part of the portion of the first subpixel electrode is exposed between the plurality of branch electrodes of the portion of the second subpixel electrode, and
wherein a difference between the first voltage and a common voltage is larger than a difference between the second voltage and the common voltage.

2. The liquid crystal display of claim 1, wherein
at least a portion of the first subpixel electrode is positioned under the insulating layer, and
the second subpixel electrode is positioned on the insulating layer.

3. The liquid crystal display of claim 2, wherein
the first subpixel electrode includes a first subregion positioned under the insulating layer and a second subregion positioned on the insulating layer, and
the first subregion and the second subregion are connected to each other through a contact hole formed in the insulating layer.

4. The liquid crystal display of claim 3, wherein
the branch electrodes extend in a plurality of different directions.

5. The liquid crystal display of claim 4, wherein
at least part of the second subpixel electrode besides the portion of the second subpixel electrode is at least approximately planar.

6. The liquid crystal display of claim 5, wherein
the second subpixel electrode has a cutout formed proximate to at least one of its outer edges.

7. The liquid crystal display of claim 2, wherein
the portion of the first subpixel electrode is a first portion, and the first subpixel electrode further includes a second portion that does not overlap the portion of the second subpixel electrode, and
the insulating layer has a plurality of openings corresponding to the second portion of the first subpixel electrode.

8. The liquid crystal display of claim 7, wherein
the branch electrodes extend in a plurality of different directions.

9. The liquid crystal display of claim 8, wherein
at least part of the second subpixel electrode besides the portion of the second subpixel electrode is at least approximately planar.

10. The liquid crystal display of claim 9, wherein
the second subpixel electrode has a cutout formed proximate to at least one of its outer edges.

11. The liquid crystal display of claim 10, wherein
the first subpixel electrode further includes a third portion that does not overlap the portion of the second subpixel electrode,
an area of overlap between the first portion of the first subpixel electrode and the portion of the second subpixel electrode is about two times an area of the second portion of the first subpixel electrode, and
an area of the third portion of the first subpixel electrode is about two times the area of overlap.

12. The liquid crystal display of claim 1, wherein
the branch electrodes extend in a plurality of different directions.

13. The liquid crystal display of claim 12, wherein
at least part of the second subpixel electrode besides the portion of the second subpixel electrode is at least approximately planar.

14. The liquid crystal display of claim 13, wherein
the second subpixel electrode has a cutout formed proximate to at least one of its outer edges.

15. The liquid crystal display of claim 1, wherein
the first subpixel electrode further includes a second portion that does not overlap the portion of the second subpixel electrode,
the portion of the second subpixel electrode is a first portion, and the second subpixel electrode further includes a second portion that does not overlap the first portion of the first subpixel electrode,
an area of overlap between the first portion of the first subpixel electrode and the first portion of the second subpixel electrode is about two times an area of the second portion of the first subpixel electrode, and
the area of the second portion of the second subpixel electrode is substantially about two times the area of overlap.

16. A liquid crystal display comprising:
a first substrate;
a first subpixel electrode positioned on the first substrate and configured to receive a first voltage;
a second subpixel electrode positioned on the first substrate and configured to receive a second voltage; and
an insulating layer positioned between the first subpixel electrode and the second subpixel electrode,
wherein one pixel area includes a first region in which a first portion of the first subpixel electrode is positioned, a second region in which a second portion of the first subpixel electrode and a first portion of the second subpixel electrode overlap each other, and a third region in which a second portion of the second subpixel electrode is positioned,
wherein the first portion of the second subpixel electrode includes a plurality of branch electrodes, and
wherein, in the second region, a part of the second portion of the first subpixel electrode is exposed between the plurality of branch electrodes of the first portion of the second subpixel electrode.

17. The liquid crystal display of claim 16, further comprising:
a second substrate facing the first substrate; and
a common electrode positioned on the second substrate,
wherein a difference between the first voltage and a common voltage is larger than a difference between the second voltage and the common voltage.

18. The liquid crystal display of claim 17, wherein
at least a portion of the first subpixel electrode is positioned under the insulating layer, and
the second subpixel electrode is positioned on the insulating layer.

19. The liquid crystal display of claim 18, wherein
an area of the second region is about two times an area of the first region, and an area of the third region is about two times the area of the second region.

20. The liquid crystal display of claim 18, wherein
the second portion of the first subpixel electrode is positioned under the insulating layer,
the first portion of the first subpixel electrode is positioned on the insulating layer, and
the first portion and the second portion are connected to each other through a contact hole formed in the insulating layer.

21. The liquid crystal display of claim 20, wherein
the plurality of branch electrodes extend in a plurality of different directions.

22. The liquid crystal display of claim 21, wherein
at least part of the second portion of the second subpixel electrode is at least approximately planar.

23. The liquid crystal display of claim 22, wherein
the second subpixel electrode has a cutout formed proximate to at least one of its outer edges.

24. The liquid crystal display of claim 18, wherein
the insulating layer has a plurality of openings corresponding to the first portion of the first subpixel electrode.

25. The liquid crystal display of claim 24, wherein
the branch electrodes extend in a plurality of different directions.

26. The liquid crystal display of claim 25, wherein
at least part of the second portion of the second subpixel electrode is at least approximately planar.

27. The liquid crystal display of claim 26, wherein
the second subpixel electrode has a cutout formed proximate to at least one of its outer edges.

28. The liquid crystal display of claim 18, wherein
the branch electrodes extend in a plurality of different directions.

29. The liquid crystal display of claim 28, wherein
at least part of the second portion of the second subpixel electrode is at least approximately planar.

30. The liquid crystal display of claim 29, wherein
the second subpixel electrode has a cutout formed proximate to at least one of its outer edges.

* * * * *